(12) United States Patent
Dundar Field

(10) Patent No.: US 12,227,638 B2
(45) Date of Patent: Feb. 18, 2025

(54) BIODEGRADABLE COMPOSITION

(71) Applicant: SEARO LABS LTD, Cambridge (GB)

(72) Inventor: Ayca Dundar Field, Cambridge (GB)

(73) Assignee: SEARO LABS LTD, Cambridge (GB)

( * ) Notice: Subject to any disclaimer, the term of this patent is extended or adjusted under 35 U.S.C. 154(b) by 118 days.

(21) Appl. No.: 17/433,956

(22) PCT Filed: Feb. 26, 2020

(86) PCT No.: PCT/GB2020/050455
§ 371 (c)(1),
(2) Date: Aug. 25, 2021

(87) PCT Pub. No.: WO2020/174234
PCT Pub. Date: Sep. 3, 2020

(65) Prior Publication Data
US 2022/0162424 A1    May 26, 2022

(30) Foreign Application Priority Data

Feb. 26, 2019  (GB) .................................... 1902558

(51) Int. Cl.
| | |
|---|---|
| *C08L 5/00* | (2006.01) |
| *A23C 19/14* | (2006.01) |
| *A23L 19/00* | (2016.01) |
| *A23L 29/00* | (2016.01) |
| *A23L 29/256* | (2016.01) |
| *A23L 29/262* | (2016.01) |
| *A23P 30/10* | (2016.01) |
| *B29B 13/06* | (2006.01) |
| *B29C 39/00* | (2006.01) |
| *B29C 43/00* | (2006.01) |
| *B29C 45/00* | (2006.01) |
| *B29K 1/00* | (2006.01) |
| *B65D 65/46* | (2006.01) |
| *C08L 1/28* | (2006.01) |

(52) U.S. Cl.
CPC .............. *C08L 5/00* (2013.01); *A23C 19/14* (2013.01); *A23L 19/03* (2016.08); *A23L 29/015* (2016.08); *A23L 29/256* (2016.08); *A23L 29/262* (2016.08); *A23P 30/10* (2016.08); *B29B 13/06* (2013.01); *B29C 39/003* (2013.01); *B29C 43/003* (2013.01); *B29C 45/0001* (2013.01); *B65D 65/466* (2013.01); *C08L 1/28* (2013.01); *A23V 2002/00* (2013.01); *B29K 2001/08* (2013.01); *B29K 2995/006* (2013.01); *C08L 2201/06* (2013.01)

(58) Field of Classification Search
CPC ...... C08L 5/00; C08L 5/12; C08L 1/28; C08L 1/284
See application file for complete search history.

(56) References Cited

U.S. PATENT DOCUMENTS

| | | | | |
|---|---|---|---|---|
| 2004/0137041 | A1* | 7/2004 | You .................... | A61K 36/04 424/443 |
| 2015/0059616 | A1* | 3/2015 | Yun .................... | C09B 67/0033 524/46 |
| 2015/0250702 | A1* | 9/2015 | Schwartz ............ | A61K 8/737 514/769 |
| 2015/0282510 | A1* | 10/2015 | Makita ................ | A23L 2/52 426/575 |
| 2015/0342242 | A1* | 12/2015 | Adden ................ | A23L 29/256 426/654 |
| 2017/0311640 | A1* | 11/2017 | Perry ................... | A23L 33/105 |
| 2018/0295869 | A1* | 10/2018 | Villa ................... | A23L 29/256 |
| 2021/0155777 | A1* | 5/2021 | Hart-Cooper ....... | C08J 5/18 |

FOREIGN PATENT DOCUMENTS

| | | |
|---|---|---|
| CN | 103450506 A | 12/2013 |
| CN | 105455571 A | 4/2016 |
| CN | 107629226 A | 1/2018 |
| CN | 107772982 A | 3/2018 |
| EP | 1417895 A1 | 5/2004 |
| JP | S63240752 A | 10/1988 |
| JP | 2002363306 A | 12/2002 |
| JP | 2003192615 A | 7/2003 |
| KR | 20130138617 A | 12/2013 |
| WO | 2004037231 A1 | 5/2004 |
| WO | 2004091538 A2 | 10/2004 |

(Continued)

OTHER PUBLICATIONS

Guohou, Sun, et al., "Rheological Behaviors and Physical Properties of Plasticized Hydrogel Films Developed From [kappa]-Carrageenan Incorporating Hydroxypropyl Methylcellulose," Food Hydrocolloids 85:61-68 (2018).

(Continued)

*Primary Examiner* — Liam J Heincer
(74) *Attorney, Agent, or Firm* — Troutman Pepper Locke LLP (Rochester)

(57) ABSTRACT

The invention provides a composition comprising a seaweed extract in an amount of 50-90% by weight, a water-soluble cellulose derivative in an amount of 10-40% by weight and water in an amount of 1-20% by weight, of the total weight of the composition. The invention also provides products, including packaging material, formed from the composition, a method of dissolving, composting and biodegrading the composition or the products, a method of producing the composition and the products, and a method of re-working the composition.

18 Claims, 13 Drawing Sheets

(56) References Cited

FOREIGN PATENT DOCUMENTS

WO   WO-2016113716 A1 * 7/2016
WO      2016181004 A1   11/2016

OTHER PUBLICATIONS

Guohou, Sun, et al., "Developing a Green Film with ph-Sensitivity and Antioxidant Activity Based on k-Carrageenan and Hydroxypropyl Methylcellulose Incorporating Prunus Maackil Juice," Food Hydrocolloids 94:345-353 (2019).
Makwana, Dipak, et al., "Characterization of Agar-CMC/Ag-MMT Nanocomposite and Evaluation of Antibacterial and Mechanical Properties for Packaging Applications," Arabian Journal of Chemistry 13:1 (3092-3099) (2018).
International Search Report and Written Opinion for PCT/GB2020/050455, dated Aug. 24, 2020.
Combined Search and Examination Report for GB1902558.4, dated Apr. 24, 2019.

* cited by examiner

A

B

A

B

C

A

B

C

A

B

C

D

A

B

C

BIODEGRADABLE COMPOSITION

This application is a national stage application under 35 U.S.C. § 371 of PCT Application No. PCT/GB2020/050455, filed Feb. 26, 2020, which claims the priority benefit of Great Britain Patent Application No. 1902558.4, filed Feb. 26, 2019, which are hereby incorporated by reference in their entirety.

TECHNICAL FIELD

This invention relates to a biodegradable composition. In particular, the invention relates to a biodegradable composition for use as a replacement for petroleum-based plastic, and bioplastic in products, such as single-use or disposable products. The invention also relates to: products, including packaging material, formed from the composition, a method of dissolving, composting and biodegrading the composition or the products, a method of producing the composition and the products, and a method of re-working the composition.

BACKGROUND

Conventional plastic products are made of either petroleum-based plastics or plant-based bioplastics. Such materials are lightweight, durable, have high barrier properties, have high tensile strength and can have transparent or translucent visual properties. Furthermore, such materials can have heat sealability and mouldability characteristics which are suitable for mass manufacturing. This makes them very desirable, for example, for use as packaging materials.

There is a general desire to move away from plastics derived from petroleum. This is largely due to the high environmental impact of such products both during production, and in the disposal stream after use. Furthermore, non-biodegradable bioplastics that are not subject to industrial composting, or other specific waste treatment processes, tend to disintegrate in nature leading to particulate plastic material (micro- or nano- plastics) that can remain in the environment, having a detrimental impact, for hundreds of years.

Left unchecked, plastic pollution is anticipated to increase fourfold by 2050, by which time it is anticipated that there will be more plastic in the oceans by weight than fish. One of the key contributors to this growing problem is single-use plastics used as structural stock keeping units [SKUs] (those that can be formed into containers that are rigid and load-bearing), such as used in packaging and disposable cups or fruit punnets.

In view of these issues there has been a recent trend towards use of biodegradable plastics. However, traditional biodegradable plastics tend to break down slowly, often over a time period that is much longer than the useful lifespan of the product. As a result, even these so-called biodegradable plastics, that are dubbed environmentally friendly, require complex waste management systems, or if discarded inappropriately, can remain in the environment for considerable time, potentially causing significant ecological harm for tens of years and even hundreds of years.

Thus, there remains a need to replace plastic and bioplastic in products with environmentally benign materials that quickly and fully biodegrade in the environment or in waste streams without, or with only minimal, harm to the environment or ecosystems. Suitably, the time for biodegradation is better matched to the timescale of use (specifically, single-use), whilst still providing at least one of the desirable material properties of conventional plastics mentioned above.

SUMMARY OF INVENTION

In a first aspect, the invention provides a composition comprising a seaweed extract in an amount of 50-90% by weight, a water-soluble cellulose derivative in an amount of 10-40% by weight and water in an amount of 1-20% by weight, of the total weight of the composition. Suitably, the seaweed extract in present an amount of 60-85% by weight, a water-soluble cellulose derivative in an amount of 10-35% by weight and water in an amount of 2-15% by weight.

An alternative composition, not forming part of the present invention but sharing many of the beneficial properties comprises the seaweed extract in an amount of 2-5% by weight, the water-soluble cellulose derivative in an amount of 80-95% by weight and water in an amount of 4-15% by weight. Each of the embodiments that follow may also be applied to this composition.

In embodiments, the composition consists essentially of the seaweed extract, the water-soluble cellulose derivative and water. In alternative embodiments, the composition consists of the seaweed extract, the water-soluble cellulose derivative and water. In embodiments, the weight percentages of the seaweed extract, the water-soluble cellulose derivative and water total 100% by weight of the total weight of the composition.

In embodiments, the seaweed extract is selected from the group consisting of: a carrageenan; agar; and a mixture thereof. Suitably, the seaweed extract is a carrageenan. More suitably, the carrageenan is carrageenan kappa.

In embodiments, the composition lacks one or more of the group consisting of: a starch; carrageenan iota; agar; alginate; and chitosan.

In embodiments, the water-soluble cellulose derivative is selected from the group consisting of: methyl cellulose (MC); hydroxypropyl methylcellulose (HPMC); and a mixture thereof. Suitably, the water-soluble cellulose derivative is methyl cellulose (MC).

In embodiments, the composition further comprises one or more additives. Suitably, the one or more additives are present in no greater than 10% by weight of the total weight of the composition. Suitably, the one or more additives are selected from the group consisting of: inorganic salt; sawdust, paper, hemp fibre; calcium carbonate; glycerine; apple puree; starch; montmorillonite (MMT); cinnamon bark oil; soybean oil; glycerol; glucose; silver nanoparticles; grapefruit seed extract; zataria multifloro essential oil; nonoclay or clay mineral; polyethylene glycol (PEG); chitin; arabinoxylan; banana powder; gelatine; titanium oxide nanoparticles; colourings; and flavourings.

In embodiments when the additive is an inorganic salt, the inorganic salt is a salt of an alkali metal or alkaline earth metal. Suitably, the inorganic salt is selected from the group consisting of: a lithium salt; a sodium salt; a calcium salt; and a potassium salt. More suitably, the inorganic salt is potassium chloride.

In embodiments, the composition of the first aspect of the invention, at a standard thickness of 0.5 mm, at least 30% of the incident light passes though without absorption or scattering. Suitably, at a standard thickness of 0.5 mm at least 50% of the incident light passes though without absorption or scattering.

In embodiments, the composition is fully biodegradable. Suitably, the composition fully biodegrades in less than six months in an external, non-industrial environment. Suitably, the composition fully biodegrades in an anaerobic atmosphere.

In embodiments, the composition is fully compostable. Suitably, the composition is compostable in less than six months in a domestic compost heap.

In embodiments, the composition is edible.

In embodiments, the composition is mouldable. Suitably, the composition is mouldable by press moulding, injection moulding or casting. In embodiments, the composition is re-worked after moulding.

In a second aspect, the invention provides a product formed from the composition of the first aspect of the invention.

In embodiments, the product has a shape selected from the group consisting of: a plate; planar sheet; a regular or irregular sphere; a regular or irregular spheroid; a regular or irregular cube; a regular or irregular cuboid; a regular or irregular ellipsoid; a regular or irregular cylinder; a regular or irregular cone; a regular or irregular prism; a regular or irregular pyramid; and any combination thereof.

In embodiments, the product is selected from the group consisting of: a structural stock keeping unit (SKU); a packaging material; a film; a sheet; a drinking straw; tubing; tampon and applicator; cutlery; a plate; a tray; and a stirrer, Suitably, the product is a packaging material selected from the group consisting of: a container; and a part thereof. More suitably, the container or part thereof is selected from the group consisting of: a cup; a tray a punnet; a clamshell; a box; a bottle; a tube; and a lid. In embodiments, the product is three-dimensional and is rigid and load bearing.

In embodiments, the maximum thickness of the composition in the product is in the range of from 0.01 mm to 5 mm. In embodiments, the product is translucent.

In a third aspect, the invention provides a method of producing the composition of the first aspect of the invention, the method comprising the steps of:
  (a) contacting the seaweed extract with water to form a seaweed extract hydrogel,
  (b) separately contacting the water-soluble cellulose derivative with water to form a water-soluble cellulose derivative solution,
  (c) mixing the seaweed extract hydrogel and the water-soluble cellulose derivative solution to form a mixture, and
  (d) allowing the mixture to dry in order to form the composition.

In embodiments, step (a) comprises (i) contacting the seaweed extract with water at a temperature in the range of approximately 5° C. and approximately 40° C.; and then (ii) heating the mixture of the seaweed extract in water to a temperature in the range of approximately 70° C. to approximately 100° C. to form the seaweed extract hydrogel.

In embodiments, in step (b) the water-soluble cellulose derivative is contacted with water at a temperature of approximately 70° C. to approximately 100° C.

In embodiments, step (c) comprises mixing the seaweed extract solution and the cellulose derivative solution at a temperature of approximately 70° C. to approximately 100° C.

In embodiments, the method comprises the steps (a) to (d) of the method of producing a composition of the third aspect of the invention, and between steps (c) and (d) the additional step of: forming the mixture into a shape or a three-dimensional form of the product. Suitably the product is a product of the second aspect of the invention.

In embodiments, the step of forming comprises moulding. Suitably, the moulding comprises press moulding, injection moulding or casting.

In embodiments, during step (d), the solid composition is supported on at least part of a mould that was used in the moulding.

In a fourth aspect, the invention provides a method of re-working a biodegradable composition, comprising producing a product by the method of the third aspect of the invention, wherein the method further comprises:
  f) softening or melting the product by contacting the product with water or steam to provide a softened product;
  g) further manipulating the softened product to provide a re-worked product, wherein the re-worked product has a different shape to the product;
  h) allowing the re-worked product to dry to provide a dried re-worked product.

In embodiments, the water in step (0 is at a temperature of greater than 80° C., or is steam.

In embodiments, the manipulation in step (g) comprises re-working the softened product to the shape of a former or mould.

In embodiments after drying in step (h), the dried shaped product is removed from the former or mould.

In embodiments, the manipulation in step (g) seals at least an edge or part of an edge of the softened product.

In a fifth aspect, the invention provides a method of dissolving the composition of the first aspect of the invention, or the product of the second aspect of the invention, the method comprising the step of contacting the composition or product with liquid water. Suitably, the liquid water is at a temperature of at least 50° C. for at least 1 hour. Suitably, the liquid water is at a temperature of at least 70° C.

In a sixth aspect, the invention provides a method of industrial biodegradation of the composition of the first aspect of the invention, or the product of the second aspect of the invention, the method comprising the step of exposing the composition or product to conditions in which the rate of biodegradation is increased. Suitably, the conditions are selected from the group consisting of: heating; exposure to water; exposure to microorganisms; enzymes; and mechanical breakdown.

In a seventh aspect, the invention provides a method of composting the composition of the first aspect of the invention, or the product of the second aspect of the invention, the method comprising the step of exposing the composition or product to conditions in which the composition or product degrades to form compost or material suitable for use in compost or as an additive to soil as fertiliser. Suitably, the conditions are adding the composition or product to previously composted or composting material.

In an eighth aspect, the invention provides a method of extending shelf-life of perishable goods, wherein the method comprises placing the perishable goods into a container or structural stock-keeping unit formed of the composition of the first aspect of the invention. Suitably, the perishable goods are selected from the group consisting of fruit; vegetables; dairy products; cheese; bread; cake; biscuits; and confectionery.

In embodiments, the shelf-life of the perishable goods is extended by at least 25%.

In a ninth aspect, the invention provides use of the composition of the first aspect of the invention, or the product of the second aspect of the invention, as packaging material or as a single-use products such as beverage containers, tampons or tampon applicators.

BRIEF DESCRIPTION OF THE DRAWINGS

One or more embodiments of the invention will now be described, by way of example only, with reference to the accompanying drawings, in which.

DETAILED DESCRIPTION

Figure 1A:
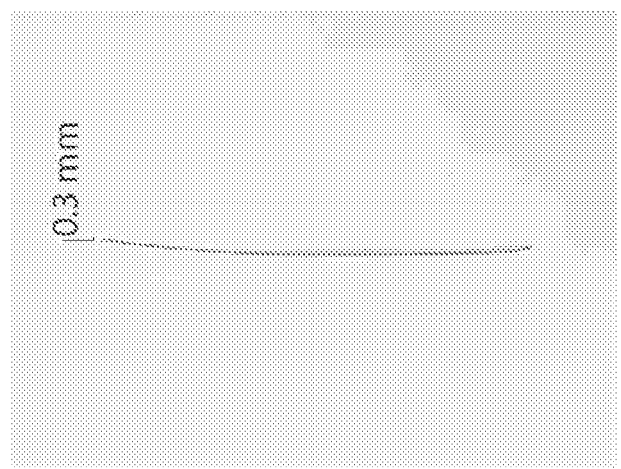
FIG. 1A shows a side view of a strip of the composition (high seaweed content embodiment) of the present invention before (A) and after (B) being contacted with water (submerged) for 24 hours. The absorption of water by the composition is evidenced by swelling from a thickness of 0.3 mm to 7 mm.
Figure 1A:
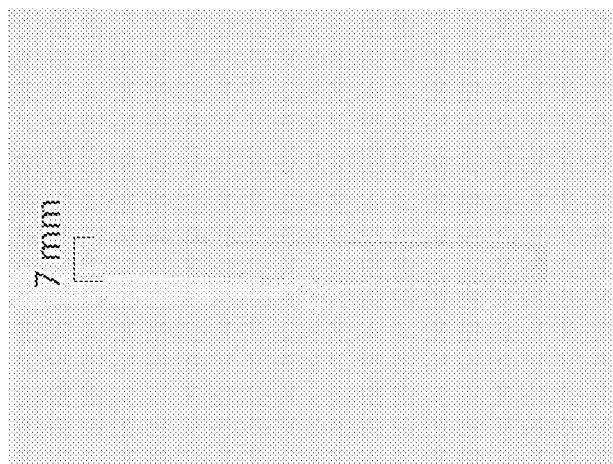

This invention generally relates to a biodegradable composition. In embodiments, the composition is suitable for use as a mouldable material for forming shaped products such as three-dimensional, structural products. Such products may be, for example, packaging materials; tableware such as plates, trays, punnets, clamshells or cups; other feeding or drinking apparatus such as a drinking straw, cutlery, or a stirrer; or other film, sheet or formed structural products. In embodiments, the composition may be used as an alternative or a replacement for petroleum-derived plastic, bioplastics and prior art biodegradable plastics.

For convenience, before further description of the present disclosure, certain terms employed in the specification, and examples, are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles 'a', 'an' and 'the' are used to refer to one or to more than one (i.e. to at least one) of the grammatical object of the article.

As used herein, the term 'comprising' means any of the recited elements are necessarily included and other elements may optionally be included as well. 'Consisting essentially of' means any recited elements are necessarily included, elements which would materially affect the basic and novel characteristics of the listed elements are excluded, and other elements may optionally be included. 'Consisting of' means that all elements other than those listed are excluded. Embodiments defined by each of these terms are within the scope of this invention. The term 'comprising', when used in respect of certain components of the composition, should be understood to provide explicit literal basis for the term 'consisting essentially of' and 'consisting of' those same components.

As used herein, the term 'biodegradable' means capable of being chemically and/or physically broken down in nature and/or by the action of living things. The term is used herein to refer to compositions, or components within compositions, that naturally break down to innocuous constituents in water or aqueous, or wet environments, typically through the action of microorganisms such as bacteria or fungi. The composition may comply with European standard EN 13432, or more generally that 90% of the material disintegrates to particle fragments having a size of no more than 2 mm after twelve weeks and biodegrades by at least 90% after six months (laboratory test method EN 14046). The term 'hyper biodegradable', as defined herein, may be used to refer to a material that has a particularly fast rate of biodegradation, for example, less than 6 months, suitably less than 3 months, to fully biodegrade in a natural, non-adapted environment, or waste stream. In this context the term 'nature' or 'natural' refers to a non-industrial environment and/or an environment that is not adapted to promote biodegradation, such as the open air or a domestic compost heap.

As used herein, the term 'compostable' means capable of being broken down in nature and/or by the action of living things for use as compost. Suitably, the term 'compostable' may be used to refer to compositions or products that may be acceptably added to a composting site. The term 'home compostable', may be used to refer to compositions or products that may be acceptably composted in a domestic environment, for example, added to a compost heap established in a domestic garden. The term may mean a plastic that conforms to the Australian norm AS 5810 "Biodegradable plastic—biodegradable plastics suitable for home composting"; the Belgian certified TÜV OK compost home certification scheme, requiring at least 90% degradation in 12 months at ambient temperature; and/or the French standard NF T 51-800 "Plastics—Specifications for plastics suitable for home composting". The term 'industrially compostable' may be used to refer to compositions or products that may be acceptably added to an industrial composting waste stream. An industrial compositing waste stream may, for example, involve an active compositing stage followed by curing. The active compositing phase typically lasts a minimum of 21 days and maintains a temperature in the compost heap of approximately 50° C. to 60° C. throughout this period. For hygienisation purposes, temperatures may remain above 60° C. for at least one week in order to eliminate pathogenic microorganisms. During the curing phase the rate of decomposition slows and the temperature lowers to <40° C. with synthesis of humic substances.

As used herein, the term 'non-hazardous' means not toxic or presenting a risk to people and animals, or the environment. In terms of chemical compounds, non-hazardous may mean complying with any one or more of EC Regulation No 1907/2006, EC Regulation No 1272/2008, REACH Directive 1999/45/EC, No 76/769/EEC, European Council Directive 793/93 and 91/155/EEC, 93/67/EEC or 67/548/EEC; or achieving a toxicity category IV (practically non-toxic and not an irritant) according to Title 40 of the United States Code of Federal Regulations (156.62), or equivalents thereof.

As used herein, the term 'edible' means a non-hazardous substance that can be ingested by a human or an animal without adverse effects or presenting a risk to health.

The term bioplastics' is used herein to mean plastic materials produced from renewable biomass sources, such as vegetable fats and oils, corn starch, straw, woodchips, sawdust, recycled food waste, etc. Bioplastic can be made from agricultural by-products. Bioplastics indicates the source of the material from which the plastic is made as being biological. Bioplastics does not infer that the material is biodegradable, although some bioplastics may also be biodegradable.

As used herein, the term 'seaweed' refers to the commonly used term for several groups of multicellular algae typically found in or close to the sea or bodies of fresh water. Types of seaweed include *Rhodophyta* (red), *Phaeophyta* (brown) and *Chlorophyta* (green) macroalgae. Many of the brown algae are referred to simply as kelp.

As used herein, the term 'seaweed extract' refers to a separated or isolated component or constituent part of seaweed. Suitably the method of separation or isolation is via chemical or physical extraction (i.e. gel press or precipitation in alcohol and alkaline hydrolysis). For example, the seaweed extract may be obtained by crushing of the seaweed plant, or part thereof, followed by filtration to remove the solid seaweed residue material; or alternatively, washing the seaweed with a suitable solvent, for example an alkaline aqueous solution, and collecting the desired extract as the, or part of the, insoluble matter that remains. The extract may be subject to further purification/separation steps. Examples of seaweed extract in accordance with the meaning herein are the extracts carrageenan, agar and alginate, suitably carrageenan.

As used herein the term 'carrageenan' refers to a family of linear sulphated polysaccharides extracted from red seaweed. There are three main varieties of carrageenan, which differ in their degree of sulfation. Carrageenan kappa has one sulfate group per disaccharide, carrageenan iota has two, and carrageenan lambda has three.

As used herein the term 'polysaccharides' refers to long chain carbohydrate molecules, specifically polymeric carbohydrates composed of monosaccharide units bound together by glycosidic linkages. Examples include 'storage polysaccharides' such as starch and glycogen, and 'structural polysaccharides' such as cellulose and chitin. Starch is a glucose polymer in which glucopyranose units are bonded by alpha-linkages; Cellulose is a polymer made with repeated glucose units bonded together by beta-linkages. Cellulose may be chemically modified, for example to alkylate free hydroxyl groups in the cellulose with various alkyl groups such as methyl, to produce methyl-cellulose; or hydroxypropyl to make hydroxypropyl cellulose (CAS No: 9004-64-2) or hydroxypropyl methyl cellulose (HPMC) (CAS No: 9004-65-3).

As used herein the term 'water-soluble cellulose derivative' refers to a material or chemical compound derived from cellulose that is readily soluble in water at room or ambient temperature. Suitably, the term refers to a material or chemical compound derived from cellulose. For example, methyl cellulose is readily soluble in water below 40° C. to 50° C.; hydroxy-propyl cellulose is readily soluble in water below 45° C. Both methyl cellulose and hydroxypropyl cellulose exhibit the atypical behaviour of becoming less soluble at higher temperatures.

Petroleum-based plastics are widely used in industry for their benefits of structural rigidity, translucency, their ability to hold liquids and be formed into shaped products. This has led to a proliferation of the use of petroleum-derived plastics in many industries, for example, in packaging for food, and other food or drink related items such as cups, plates, and cutlery. Such products may be formed by moulding (such as injection moulding, blow moulding, press moulding, extrusion etc.) or casting, or by formation into sheets that it then re-worked to form shaped and/or three-dimensional products.

As is now well-documented, while petroleum-based plastics and some bioplastics have many desirable material properties, the issues with their use is related to its longevity in the environment or waste streams, suggested to be between 10 years to 1,000 years. This timescale for decomposition is entirely out of proportion to the typical useful lifespan for the plastic, which in the case of food packaging, for example, may be a matter of hours or days. The fact that plastics used to produce single-use products may continue to persist for up to 1,000 years after the product is discarded is clearly highly problematic from an environmental or ecological standpoint.

Even plastics termed biodegradable, for example polylactic acid (PLA) or polyhydroxyalkanoates (PHA), can still take many months or even many years to fully biodegrade. This means the plastic will remain intact in the environment for this period having largely the same negative effects on ecosystems and wildlife as petroleum-based plastics.

The increasing use of plastics, whether petroleum-based, or plant-based, or plant-derived bioplastics or those termed biodegradable, and the slow, or relatively slow, decomposition rate of these materials relative to their use-case as products has led to an increasing abundance of plastic waste in our landfills, and in the wider environment, including particulate material in the seas and oceans. This has caused and continues to cause unprecedented damage to environments and ecosystems on land, in the air and at sea. The persistence of plastics and bioplastics in the environment also means that should they not be disposed of by an appropriate waste stream, they can remain as unsightly rubbish on the streets, and can cause blockages of water courses and sewers, leading to expensive measures and cleaning operations to retrieve these materials. Furthermore, the slow but eventual break-down of plastics and bioplastics in the environment is known to lead to the release of so called 'micro-plastics' or 'nano-plastics' (plastic particles having a size in the micrometre or nanometre range) that cause further damage to ecosystems. Most recently it has been recorded that 'nano-plastics' are polluting the air and subsequently being inhaled by humans and other living organisms as a result. The full effects of this mode of plastic pollution is as yet unknown, though many plastics are known to leach hazardous chemicals as they age and breakdown which may be expected to irritate the lungs and other bodily organs, leading to discomfort and disease. When animals ingest plastics or bioplastics that they are unable to digest this can cause blockages to their digestive system, in some cases this leads to starvation which may result in death of the animal.

Further ecological issues with plastics and bioplastics can also be identified in the fact that they break-down slowly and, often, do not biodegrade, or at least do not biodegrade fully, in composting facilities. This can lead to plastic contaminants being applied to the soil as part of the compost thereby lowering the quality of soil as a result. The global human population is expected to grow from 7.6 billion today to approximately 10 billion over the next 30 years. This will mean more pressure on the agriculture industry and on land use to grow food for people and livestock. Any reduction in soil fertility today or over the present century runs directly counter to the needs of an expanding global population dependent on this fundamental resource.

The present invention relates to a biodegradable composition that decomposes fully and rapidly (hyper biodegradable) in the environment, particularly in aqueous or otherwise non-dry environments of various kinds, or in waste streams, yet maintains one, more or all of the benefits of petroleum-based plastics or plant-based bioplastics, during its lifetime of use.

The composition of the present invention generally comprises a seaweed extract and a water-soluble cellulose derivative. The composition may further comprise water. Suitably the composition comprises a seaweed extract, a water-soluble cellulose derivative and water.

Suitably the composition consists essentially of a seaweed extract, a water-soluble cellulose derivative and water. Suitably the composition consists of a seaweed extract, a water-soluble cellulose derivative and water.

In embodiments, the seaweed extract may be a carrageenan, agar, or a mixture thereof. The family of carrageenan compounds and agar are well-known in the food, pharma and personal care product fields; however, they are chemically distinct. Carrageenans comprise repeat units of β-D-galactose-cc-D-galactose, while agar comprises repeated β-D-galactose-α-L-galactose. Suitably, the seaweed extract used in the composition of the present invention is a carrageenan. More suitably, the carrageenan may be carrageenan kappa.

It is contemplated that any seaweed extract may be useful in the present invention. As would be expected however, while carrageenans, agar and other seaweed extracts have a common source (seaweed), and related chemical structures, each substance has significantly different properties when forming hyper biodegradable plastic replacement materials therefrom. For example, carrageenans, in particular, carrageenan kappa, when mixed with a water-soluble cellulose derivative, for example methyl cellulose, as in the present invention displays surprisingly beneficial mechanical and visual material properties compared to agar and other seaweed extracts.

In embodiments, the water-soluble cellulose derivative may be any suitable material or compound derived from cellulose. Suitably, the water-soluble cellulose derivative may be methyl cellulose (MC), hydroxypropyl methylcellulose (HPMC), or a mixture thereof. Suitably, the water-soluble cellulose derivative may be methyl cellulose (MC).

In embodiments, the composition comprises only a seaweed extract, such as a carrageenan, and a water-soluble cellulose derivative, such as methyl cellulose, with the remainder of the composition being water. In other words, and as defined herein, the composition may consist of a seaweed extract and a water-soluble cellulose derivative, or a seaweed extract and a water-soluble cellulose derivative and water. In other words, the weight percentages of these components may add up to 100% by weight based on the total weight of the composition.

In embodiments, it is contemplated that other minor additives may be included that may provide one or more benefits without detrimentally affecting the overall properties of the composition. In other words, and as defined herein, the composition may consist essentially of a seaweed extract and a water-soluble cellulose derivative, or a seaweed extract and a water-soluble cellulose derivative and water. The term 'minor additives' or 'additives' is intended to relate to additives other than a seaweed extract and a water-soluble cellulose derivative, that may be present in the composition in an amount of 20 wt % or less. Suitably, less than 15 wt %, 10 wt %, 5 wt %, 2 wt %, 1 wt %. All weight percentages are based on the total weight of the composition. In other words, the weight percentages of the seaweed extract, the water-soluble cellulose derivative, water and the minor additive(s) may add up to 100% by weight based on the total weight of the composition.

The additives or minor additives may be, although not limited to: inorganic salts such as potassium chloride or calcium chloride; sawdust, paper, hemp fibre; calcium carbonate; glycerine; apple puree; starch; montmorillonite (MMT); cinnamon bark oil; soybean oil; glycerol; silver nanoparticles; grapefruit seed extract; zataria multifloro essential oil; nonoclay or clay mineral; polyethylene glycol (PEG); chitin; arabinoxylan; banana powder; gelatin; titanium oxide nanoparticles. Alternatively, in embodiments, the composition of the present invention, and products formed therefrom, may lack any minor additives, including but not limited to one or more of those listed above.

In embodiments, the composition may comprise a salt, more suitably an alkali metal salt or an alkaline earth metal, even more suitably a lithium, sodium, calcium or a potassium salt. Most suitably, the composition may comprise a potassium salt. In embodiments, the potassium salt is potassium chloride. Suitably, the composition may comprise the salt in an amount in the range between 0.1-5% by weight, more suitably in the range between 0.5-3% by weight, even more suitably in the range between 0.5-1.5% by weight. Suitably, the salt may be present in the composition in an amount of at least 0.1% by weight, 0.2% by weight 0.3% by weight, 0.4% by weight, 0.5% by weight, 0.6% by weight, 0.7% by weight, 0.8% by weight, 0.9% by weight, 1.0% by weight, 2.0% by weight, 3.0% by weight, 4.0% by weight or above. Suitably the salt may be present in the composition in an amount of at most 5.0% by weight, 4.0% by weight, 3.0% by weight, 2.0% by weight, 1.9% by weight, 1.8% by weight, 1.7% by weight, 1.6% by weight, 1.5% by weight or below; all weight percentages are based on the total weight of the composition. Without wishing to be bound by theory, it is believed that the inclusion of such salts can increase the rigidity of the resulting composition and products formed therefrom.

In embodiments, the composition may comprise glycerol. More suitably, the composition may comprise glycerol in an amount in the range of 0.1-5% by weight, even more suitably in the range of 1-3% by weight, more particularly 1.5-2.5% by weight, all weight percentages are based on the total weight of the composition. Without wishing to be bound by theory, it is believed that the inclusion of glycerol can increase the flexibility of the resulting products.

In embodiments, that may be called for reference purposes herein only, 'low seaweed extract compositions', the composition may comprise the seaweed extract in an amount of 1-10% by weight, suitably 2-5% by weight. Suitably the composition may comprise the seaweed extract in an amount of at least 1% by weight, 2% by weight, 3% by weight, 4% by weight, 5% by weight, 6% by weight, 7% by weight, 8% by weight, or 9% by weight. Suitably the composition may comprise the seaweed extract in an amount of at most 10% by weight, 9% by weight, 8% by weight, 7% by weight, 6% by weight, 5% by weight, 4% by weight, 3% by weight, or 2% by weight. All weight percentages are based on the total weight of the composition.

In embodiments, the low seaweed extract composition may comprise the water-soluble cellulose derivative in an amount of 70-95% by weight, more particularly 80-95% by weight. Suitably the composition may comprise the water-soluble cellulose derivative in an amount of at least 70% by weight, 75% by weight, 80% by weight, 85% by weight, or 90% by weight. Suitably the composition may comprise the water-soluble cellulose derivative in an amount of at most 95% by weight, 90% by weight, 85% by weight, 80% by weight, or 75% by weight. All weight percentages are based on the total weight of the composition.

In embodiments, the low seaweed extract composition may comprise 2-20% by weight water, even more particularly 4-15% by weight, all weight percentages are based on the total weight of the composition. Suitably the composition may comprise the water in an amount of at least 2% by weight, 3% by weight, 4% by weight, 5% by weight, 6% by weight, 7% by weight, 8% by weight, 9% by weight, 10% by weight, 11% by weight, 12% by weight, 13% by weight, or 14% by weight. Suitably the composition may comprise the water in an amount of at most 15% by weight, 14% by weight, 13% by weight, 12% by weight, 11% by weight, 10% by weight, 9% by weight, 8% by weight, 7% by weight, 6% by weight, 5% by weight, 4% by weight, or 3% by weight. All weight percentages are based on the total weight of the composition.

In a specific embodiment of a low seaweed extract composition in accordance with the present invention, the composition may comprise carrageenan kappa in an amount of 2-5% by weight, methyl cellulose in an amount of 80-95% by weight, water in an amount of 4-15% by weight. In an embodiment the composition may further comprise 1-5% by weight potassium chloride.

All weight percentages are based on the total weight of the composition. In embodiments, the weight percentages of carrageenan kappa, methyl cellulose, water and optionally potassium chloride may add up to 100% by weight based on the total weight of the composition.

In alternative embodiments that may be called for reference purposes herein only, 'high seaweed extract compositions', the composition may comprise the seaweed extract in an amount of 40-95% by weight, suitably 50-95% by weight, more suitably 60-90% by weight. Suitably the composition may comprise the seaweed extract in an amount of at least 40% by weight, 45% by weight, 50% by weight, 55% by weight, 60% by weight, 65% by weight, 70% by weight, 75% by weight, 80% by weight, 85% by weight, or 90% by weight. Suitably the composition may comprise the seaweed extract in an amount of at most 95% by weight, 90% by weight, 85% by weight, 80% by weight, 75% by weight, 70% by weight, 65% by weight, 60% by weight, 55% by weight, 50% by weight, or 45% by weight. All weight percentages are based on the total weight of the composition.

In embodiments, the high seaweed extract composition may comprise the water-soluble cellulose derivative in an amount of 5-50% by weight, more suitably 10-40% by weight. Suitably the composition may comprise the water-soluble cellulose derivative in an amount of at least 5% by weight, 10% by weight, 15% by weight, 20% by weight, 25% by weight, 30% by weight, 35% by weight, 40% by weight, or 45% by weight. Suitably the composition may comprise the water-soluble cellulose derivative in an amount of at most 50% by weight, 45% by weight, 40% by weight, 35% by weight, 30% by weight, 25% by weight, 20% by weight, 15% by weight, or 10% by weight. All weight percentages are based on the total weight of the composition.

In embodiments, the high seaweed extract composition may comprise 1-20% by weight water, even more particularly 2-15% by weight, all weight percentages are based on the total weight of the composition. Suitably the composition may comprise the water in an amount of at least 2% by weight, 3% by weight, 4% by weight, 5% by weight, 6% by weight, 7% by weight, 8% by weight, 9% by weight, 10% by weight, 11% by weight, 12% by weight, 13% by weight, or 14% by weight. Suitably the composition may comprise the water in an amount of at most 15% by weight, 14% by weight, 13% by weight, 12% by weight, 11% by weight, 10% by weight, 9% by weight, 8% by weight, 7% by weight, 6% by weight, 5% by weight, 4% by weight, or 3% by weight. All weight percentages are based on the total weight of the composition.

In a specific embodiment of a high seaweed extract composition in accordance with the present invention, the composition may comprise carrageenan kappa in an amount of 50-90% by weight or suitably 66-85% by weight, methyl cellulose in an amount of 25-35% by weight or suitably 11-33% by weight, water in an amount of 4-25% by weight or suitably 2-11% by weight. In embodiments the composition may further comprise 1-5% by weight potassium chloride. All weight percentages are based on the total weight of the composition. In embodiments, the weight percentages of carrageenan kappa, methyl cellulose, water, and optionally potassium chloride, may add up to 100% by weight based on the total weight of the composition.

The composition of the present invention is hygroscopic, i.e. it absorbs water. The high seaweed extract compositions are more hygroscopic than the low seaweed extract compositions, however both absorb water to at least some degree. Without wishing to be bound by theory it is believed that the exceptional biodegradability, or hyper biodegradability, of the composition of the present invention is, at least in part, due to its ability to absorb water which, along with the major components of the composition being a natural food source, encourages and facilitates the growth of the microorganisms such as bacteria or fungi on the composition that that lead to its biodegradation.

Figure 1B:
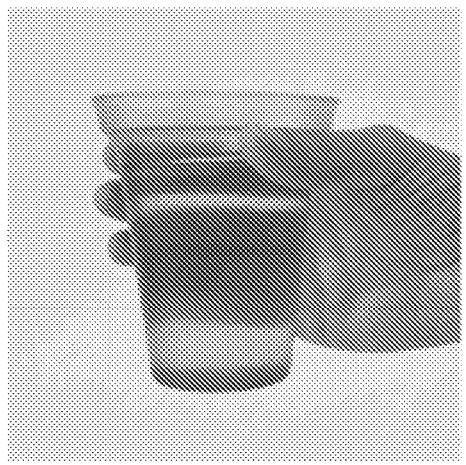
FIG. 1B shows an embodiment of a cup formed of the composition (high seaweed content embodiment) of the present invention holding water at room temperature. (A) shows the cup immediately after water is poured into the cup (T=0); (B) shows the cup 1.5 hours after the water is poured into the cup (T=1.5); (C) shows the cup 8.0 hours after the water is poured into the cup (T=8.0); it can be seen that the composition absorbs water at room temperature and begins to deform yet retains its structural integrity and remains watertight. The composition, on absorption of water, attains a texture and consistency like silicone.
Figure 1B:
Figure 1B:

The high seaweed extract composition of the present invention can absorb significant amounts of water without losing integrity or leaking or splitting when used as a container for water or water-based liquids. The high seaweed extract composition of the present invention can absorb water at temperatures at or below around 60° C.; above this temperature, the high seaweed composition starts to dissolve. For example, the material may absorb approximately 10-13 grams of water per gram of material leading to an approximately 1,000% to 1,300% change in weight of the material on exposure to water. The composition having absorbed water, has a silicone-like feel to the touch. FIG. 1A shows the visual swelling of a strip of material formed of the high seaweed extract composition before and after submersion in water for 1 day, FIG. 1B shows the visual swelling of a cup formed of the high seaweed extract composition on exposure to water over a period of 8 hours. As can be seen, the cup while absorbing the water from contact, maintains sufficient structural integrity to retain its general shape and the water in the cup.

The composition's propensity to absorb water on contact encourages microorganism growth and thereby promotes rapid (<2 months for the high seaweed extract composition) and significant biodegradation in contact with water in the air [for example, humidity or precipitation] (urban roadside-type environment), in compost, in waste streams, or in sewers, the sea or rivers.

In addition, and without wishing to be bound by theory, it is postulated that the ability of the material to absorb water in this way, and then release it again by evaporation is a factor in its rapid physical degradation due to the stresses created in the material through wetting and drying cycles leading to collapse and fragmentation of the material structure.

Figure 9:
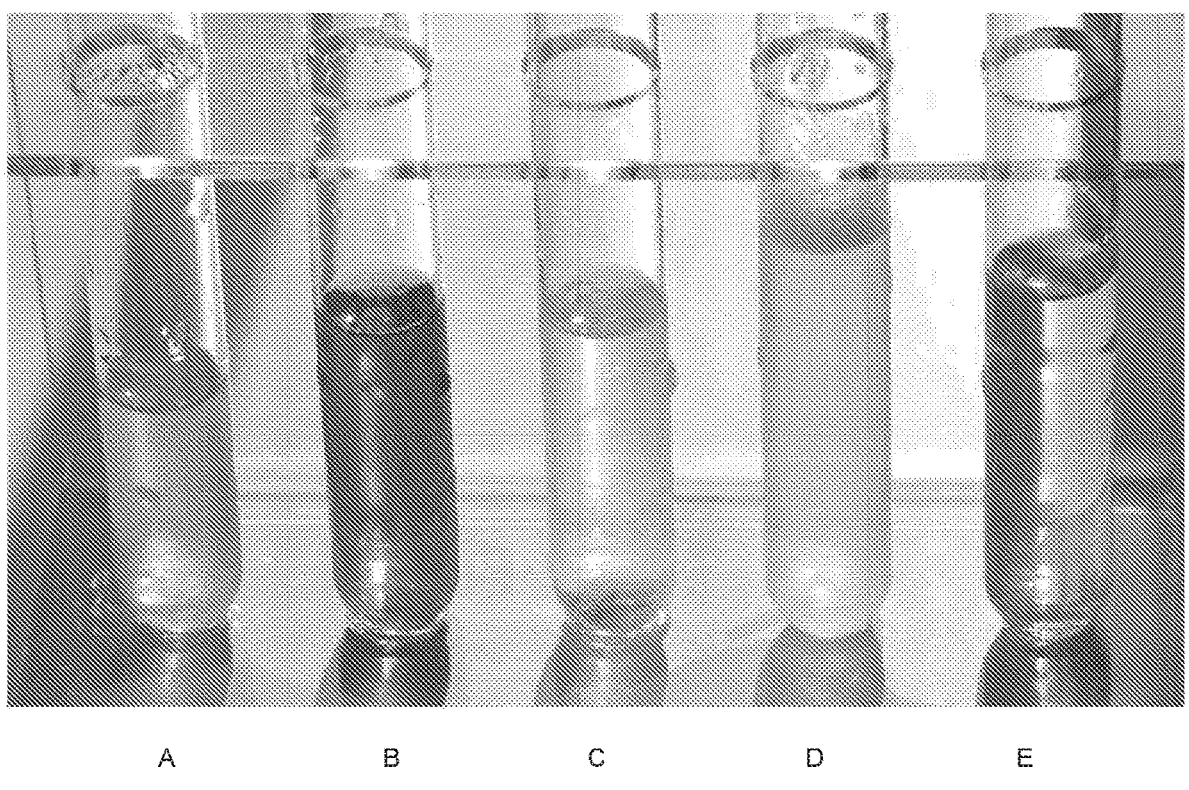
FIG. 9 shows results of a biodigestion test. From left to right, shredded strips of the composition of the present invention are shown in bile salts (A); Protease HCI (B); Amylase (C); Saliva (D) and de-ionised water (E). The shredded strips either fully disintegrated or are dissolved in the given solution at room temperature over 3 hours.

The composition of the present invention also disintegrates and/or dissolves in digestive tract fluids. As shown in FIG. 9, the composition of the present invention disintegrates and/or dissolves in typical mammalian digestive fluids, such as bile salts, acidic protease solution, amylase, saliva at room temperature. Therefore, in view of the innocuous and food-safe components, it is anticipated that the composition is non-hazardous for human and/or animal consumption, i.e. the material is, in principle at least, edible. As seaweed extract, in particular, carrageenans and agar, for example, are common additives in many food products, it is a feature of the compositions of the present invention that the composition is food safe. It is contemplated that products formed of the composition may be eaten by the end user. In view of the surprisingly beneficial properties in the decomposition of the composition in digestive fluids, this provides a means of disposing of the material without the need for a specialised waste stream.

In the low seaweed extract embodiments, the composition may be soluble in liquid water at a temperature of 40° C. or less, more particularly 30° C. or less, even more particularly 25° C. or less. The length of time required for dissolution depends on the form, or shape, and thickness of the material. For example, sheet material with a thickness of approximately 1 mm, complete dissolution would be expected within 3 hours at room temperature with continuous mixing.

In the high seaweed extract embodiments, the composition may be soluble in water at a temperature of at least 50° C., more particularly at least 75° C., even more particularly at least 85° C. The length of time required for dissolution depends on the form, or shape, and thickness of the material sheet material wall thickness of approximately 1 mm, complete dissolution would be expected within 1 hour at 85° C. with continuous mixing.

While the composition of the present invention, or products formed therefrom, exhibit surprisingly beneficial properties in terms of biodegradability in the environment or in water, the compositions, or products formed therefrom, when stored in relative humidity conditions of 70% or less may exhibit a shelf life prior to use of up to 3 years, more particularly 2-3 years.

In a further aspect, the invention relates to products comprising or formed from the biodegradable composition described above. In embodiments, the product may be a shaped article, such as a sheet or film, or the product may be a three-dimensionally shaped article. Suitably the three-dimensionally shaped article may be generally shaped as plate or planar sheet, or as a regular or irregular sphere or spheroid, a cube or cuboid, an ellipsoid, a cylinder, a cone, a prism, a pyramid, or a combination of these. Suitably, the product may be packaging material. Suitably, the packaging material may be a container or part thereof. Suitably, the container or part thereof may be a cup, tray, punnet, clamshell, box, bottle, tube or lid. Suitably the container, or part thereof may be packaging material, in particular, packaging material for perishable goods such as food. In addition to packaging, the invention also relates to other single-use consumer products such as drinking straws, cups, tampon and tampon applicator tubing such as the rods of cotton buds, a plate, or a food tray formed from the composition described above. The surprising structural rigidity of the and other material properties of the composition make it particularly suited to use in structural three-dimensional products with thin walls, such as packaging material and cups.

In embodiments, the thickness of the product may be appropriate for the use, for example a tampon may be 1 cm or more in thickness. Suitably, the products of the invention, when for example the products are biodegradable packaging material or cups, may have a thickness (minimum distance between two surfaces of the product) of 5 mm or less. Suitably, the products may have a thickness of at most 4.5 mm, 4.0 mm, 3.5 mm, 3.0 mm, 2.5 mm, 2.0 mm, 1.5 mm, 1.0 mm, 0.5 mm, 0.4 mm, 0.3 mm. 0.2 mm or 0.1 mm or less or less. Suitably, the products may have a thickness of at least 0.05 mm, 0.1 mm, 0.2 mm, 0.3 mm, 0.4 mm, 0.5 mm, 0.6 mm, 0.7 mm, 0.8 mm, 0.9 mm or 1.0 mm or more. Each of these thicknesses can be used in three-dimensional products that are structural and load bearing.

In embodiments, and at the thicknesses above, the packaging material may be suitable for heat sealing using industry-standard techniques, such as with wetting or steam and/or pressure. The high seaweed extract composition may need both steam and pressure as the steam would melt the surface of the material and would create and adhesive surface which would allow the material stick to each other. On the other hand, low seaweed extract would only need cold water and pressure as the material would soften in cold water to create an adhesive surface on the material which would allow the surfaces to stick and contiguously mould to each other.

In contrast to some prior art biodegradable plastics or bioplastics, which are limited in their structural rigidity and are generally used as films or sheets, for example coatings for pharmaceutical tablets, the composition of the present invention forms on moulding and subsequent drying a hard, rigid, self-supporting structure with the ability to support loads and/or hold beverages properties similar to that of petroleum-based plastics such as PET or polystyrene. The rigid and high tensile strength properties of the composition of the present invention allows use of the material to form 'structural packaging' i.e. packaging or products that form a three-dimensional, load bearing structure without exterior support of structures, as well as films or sheets wrapped around and supported by other structures or products. Without wishing to be bound by theory, it is believed the seaweed extract, suitably carrageenans, in particular carrageenan kappa, that provides the surprisingly beneficial properties in terms of structure and load bearing to the composition.

The composition of the present invention, or products formed therefrom may accept printed media, for example water-based or oil-based inks. The composition of the present invention, and products formed thereof may suitably be moulded to show embossed detail present on the mould. The structural rigidity of the products, similar to that of petroleum-based plastics, means that it would be expected that product forms of the composition of the present invention would be able to be used in current printing machinery without modification.

In addition, in embodiments, it is a particular advantage of the products formed from or comprising the composition of the present invention that they may be transparent (allows light to pass through with no or minimal scattering or absorption) or at least translucent (allows light to pass through with some scattering or absorption). Suitably, greater than 30% of incident light may be transmitted through the composition at a standard thickness (minimum distance between two surfaces) of 0.5 mm without scattering or loss. Suitably, greater than 35%, 40%, 45%, 50%, 55%, 60%, 65%, 70%, 75%, 80%, 85%, 90%, or 95%, or 100% of incident light may pass through the material without scattering or loss at a standard thickness (minimum distance between two surfaces) of 0.5 mm. Measurement of light transmittance may be measured in accordance with ASTM D1746.

Transparency or translucency provides an appealing appearance similar in nature to clear PET plastic or PLA bioplastic. Without wishing to be bound by theory, it is believed that the addition of the water-soluble cellulose derivative, for example methyl cellulose, acts to lower the viscosity of the seaweed extract solution, suitably carrageenan kappa solution, allowing for more effective defoaming (removing trapped air bubbles) during manufacture. This improves the light transmission through the final dried, moulded product. It is also believed that the addition of the water-soluble cellulose derivative, for example methyl cellulose, also dilutes the natural colouration of the seaweed extract solution, suitably carrageenan kappa solution, to mean the dried, moulded product is substantially colourless, or has only minor colouration resulting in no or minimal light being absorbed or scattered by the material.

Seaweed extract such as carrageenan kappa has a yellow/brown pigmentation. Increasing the seaweed extract content would intensify the yellow/brown colouration of the final material.

The translucency of the composition of the invention, or products formed thereof, is at least in part dependent on the thickness (minimum distance between two surfaces) of the material as formed. In embodiments, the products of the invention that would be expected to be transparent or translucent may have a thickness (minimum distance between two surfaces of the product) of 5 mm or less. Suitably, the products may have a thickness of at most 4.5 mm, 4.0 mm, 3.5 mm, 3.0 mm, 2.5 mm, 2.0 mm, 1.5 mm, 1.0 mm, or 0.5 mm or less. Suitably, the products may have a thickness of at least 0.1 mm, 0.2 mm, 0.3 mm, 0.4 mm, 0.5 mm, 0.6 mm, 0.7 mm, 0.8 mm, 0.9 mm or 1.0 mm or more.

In embodiments, wherein the composition, or the products formed therefrom, have a thickness of greater than 5 mm, or suitably, 6 mm, 7 mm, 8 mm, 9 mm, or 10 mm, the product may be substantially opaque (i.e. substantially no light may pass through). In this way, the resulting product may look and feel like opaque polyethylene terephthalate (PET) or polylactic acid (PLA). In embodiments, to increase the opacity of the composition, a composite approach may be used, by adding an aggregate such as sawdust or paper fibre, etc.

The products of the invention, for example the packaging materials, may exhibit useful oxygen barrier properties. This can mean that the packaging material will keep the contained items fresher for longer and increase their shelf-life.

In another surprising benefit of the present invention it has been found that food packaging made from or comprising the composition of the present invention can lead to an enhanced shelf life for food, suitably fresh food, vegetables or dairy products such as cheese, contained therein, as compared to traditional petroleum-based plastics such as, for example, polyethylene terephthalate (PET) or bioplastics such as PLA. The hygroscopic nature of the composition means that any ambient moisture inside the packaging is absorbed, and retained by, the composition meaning the environment in which the food is stored becomes less suitable for microorganism growth that is typically responsible for mould growth and decay. This, alongside the oxygen barrier properties of the composition, retards decomposition of the food within the packaging and lengthens the food's shelf life as a result.

In embodiments, the shelf life (defined as the length of time for which an item remains fit for consumption, or saleable) of produce or perishable goods contained within a product or structural stock keeping units (SKUs) may be extended by at least 10% at a given temperature. Suitably, the shelf life may be extended by at least 20%, 30%, 40%, 50%, 60%, 70%, 80%, 90%, 100%, 200%, 300%, 400%, 500% or more.

Figure 10:
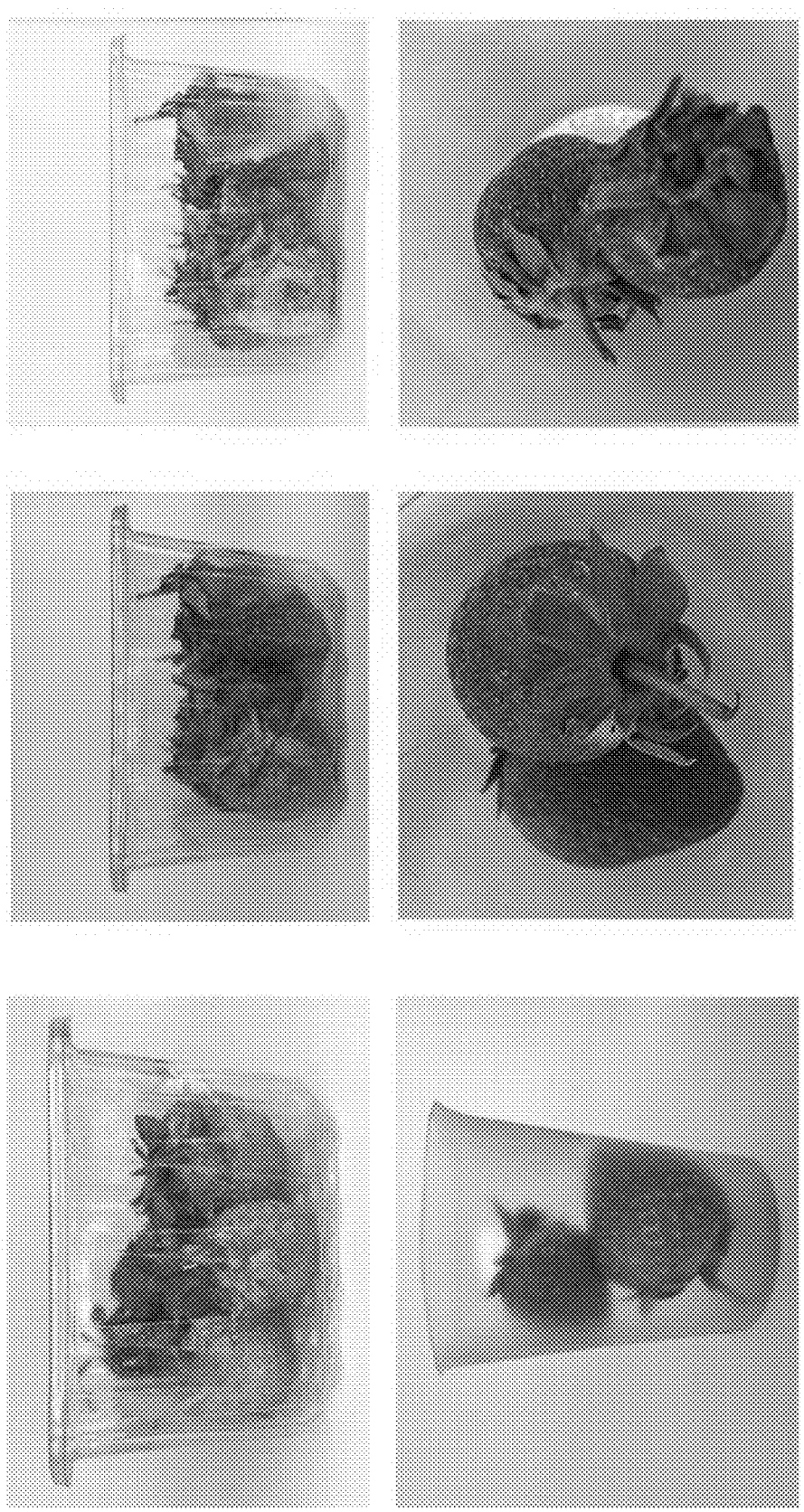
FIG. 10 shows a comparative example of the storage of soft fruit (strawberries) in unrefrigerated ambient conditions, in packaging material formed of the composition of the present invention (bottom line) compared to packaging material formed of petroleum-derived PET (top line), after 1-2 days (column A), 3 days (column B) and 4 days (column C). It is evident that there is condensation on the inner wall of the PET packaging after 3 days which increases by 4 days. No condensation is evident on the packaging formed of the present invention. As condensation implies high humidity which encourages bacterial and fungal growth, it suggests packaging of the present invention would lead to lower rates of bacterial or fungal growth on the food product contained therein.
Figure 11:
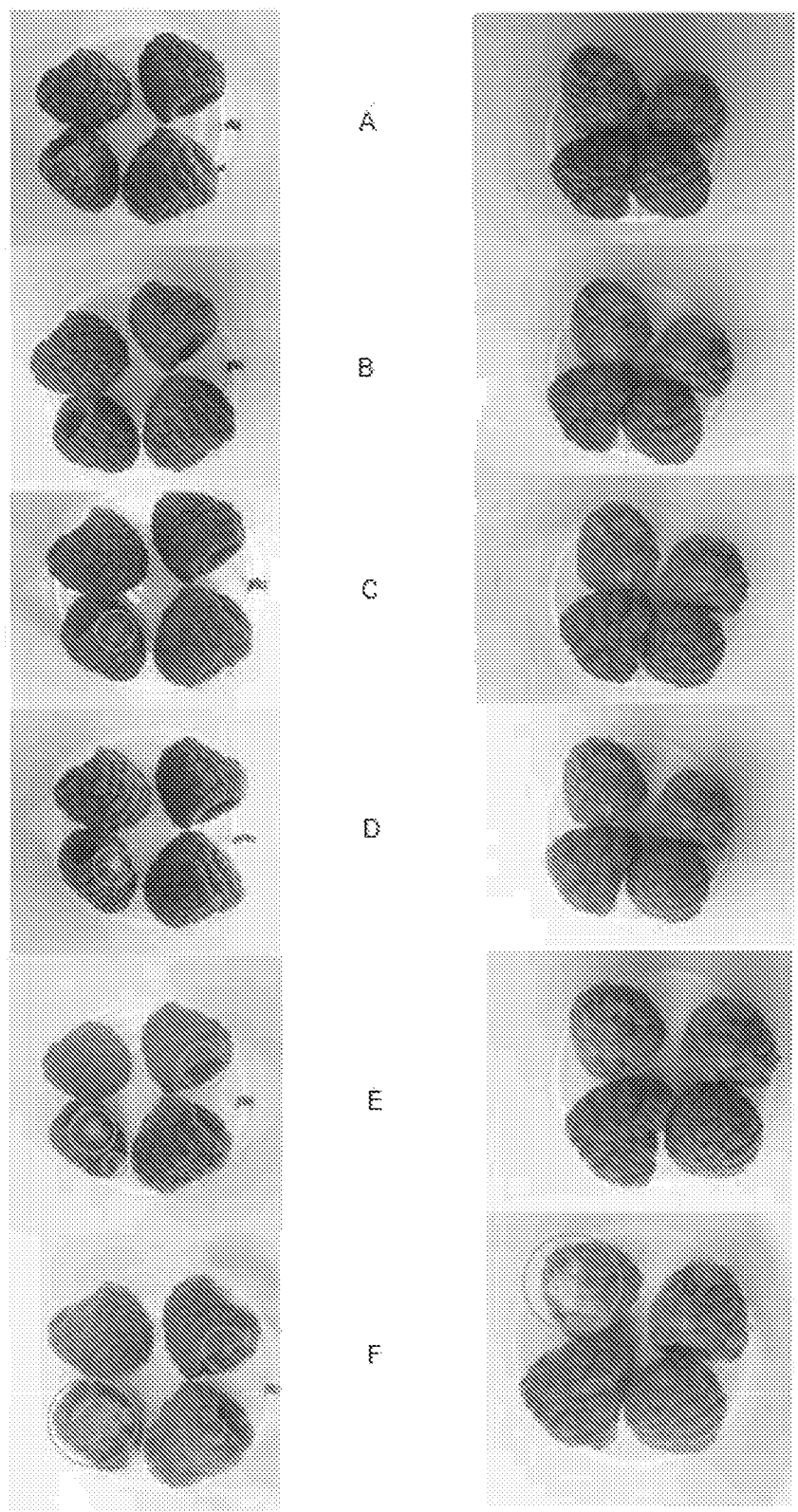
FIG. 11 shows a comparative example of the storage of soft fruit (raspberries) in unrefrigerated ambient conditions in packaging material formed of the present invention (right column) compared to packaging material formed of petroleum-derived PET (left column) after 1 day (row A), 2 days (row B); 3 days (row C); 4 days (row D); 5 days (row E); and 6 days (row F). It is evident that the raspberries in the PET cup start to develop mould on the third day, whereas raspberries in the cup formed of the composition of the present invention are free of mould until day 6, yielding a 100% increase in shelf-life.
Figure 12:
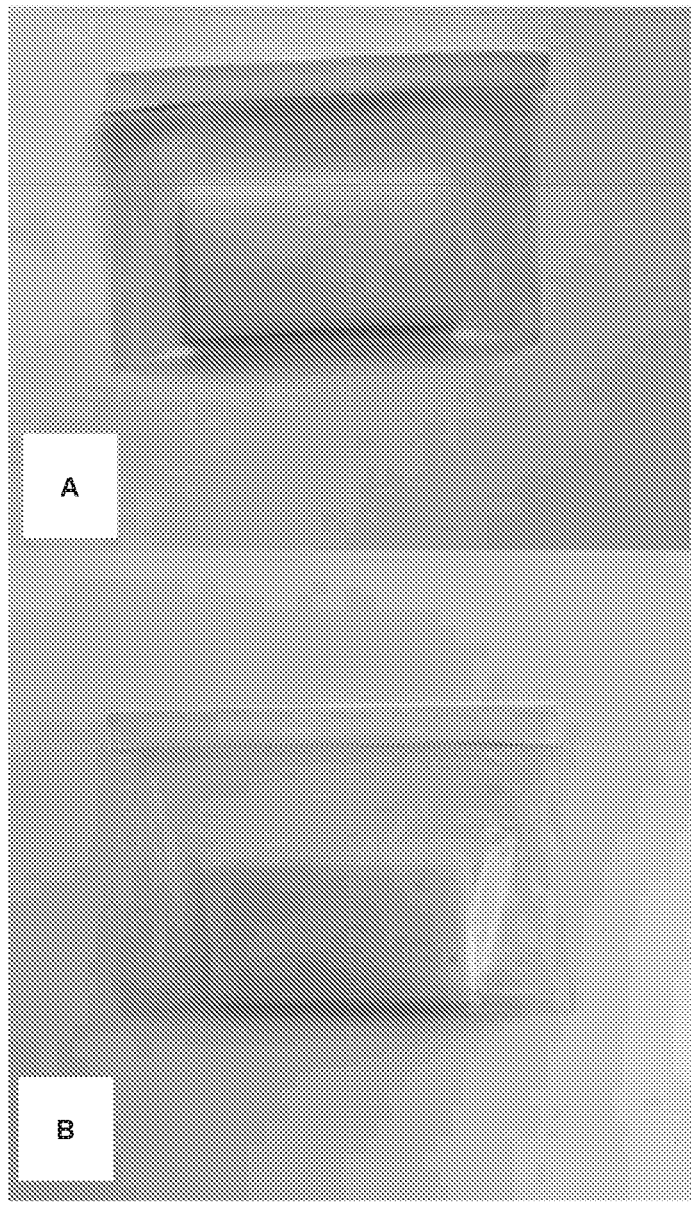
FIG. 12 shows a slice of cheddar cheese that has been heat sealed in a pouch made from the composition of the present invention. The top figure shows the cheese immediately after sealing, and the bottom picture shows the same cheese after storage for 1.5 years. There is no visible sign of deterioration of the cheese after this time period.

As best shown in FIGS. 10 to 12, soft fruit, specifically strawberries and raspberries, and dairy products, for example cheddar cheese, held in packaging made from the composition of the present invention show reduced condensation on the walls of the packaging when compared to prior out packaging made from PET. The rate of decomposition of the fruit stored in the packaging is also shown to be slowed.

As the composition is formed of natural materials that are already commonly found in food products as thickeners or gelling agents, the products of the invention are edible, i.e. they are non-toxic to humans and/or animals by contact or ingestion. The composition may contain flavourings or other minor components to enhance the palatability of the materials. This, in line with the evidence that the composition of the present invention dissolves or disintegrates in digestive tract fluids, represents a further environmentally friendly means of disposal of the composition.

In a further aspect, this invention relates to a method of preparing a composition as defined above, the method comprising the steps of:
(a) contacting a seaweed extract with water, or other suitable polar solvent, to form a seaweed extract hydrogel;
(b) separately contacting a water-soluble cellulose derivative with water, or other suitable polar solvent, to form a solution, or gel or slurry, of the cellulose derivative;
(c) mixing the seaweed extract hydrogel and the cellulose derivative solution to form a mixture;
(d) allowing the mixture to dry in order to form the composition.

The seaweed extract in step (a) and/or cellulose derivative in step (b) may as defined elsewhere herein.

Suitable polar solvents in step (a) or (b), aside from water, may be any polar solvent that can form suitable hydrogels with the seaweed extract, or a suitable solution, slurry or hydrogel with the water-soluble cellulose derivative. Suitably, the polar solvent has a boiling point that allows drying of the formulation after moulding. Suitably, the solvent is non-hazardous and not damaging to the environment. Polar solvents in this context may include, but are not limited to, ethanol, methanol, propanol, butanol, acetone, ethyl acetate and dimethylsulfoxide.

In embodiments, in step (a) seaweed extract, suitably in powder form, is mixed, or otherwise combined, with cold water to form a paste. This paste is then heated, suitably with mixing, to an elevated temperature. On heating, the seaweed extract hydrogel is formed. Suitably, the elevated temperature may be 80° C. or more, more suitably 80-100° C., even more suitably 90-100° C. In embodiments, the paste may be held at the elevated temperature for between approximately 20 minutes and approximately 4 hours. Suitably, contact is for between approximately 1 hour and approximately 3 hours. Most suitably, contact is for approximately 2 hours.

In embodiments, in step (a) the concentration of seaweed extract in the seaweed extract hydrogel may be 4-8% w/v in the seaweed extract hydrogel, even more suitably 6-7% w/v, more suitably 6.7%. In embodiments, after step (a), further water, or other suitable polar solvent as appropriate is added to the hydrogel to achieve the desired viscosity. Suitably the consistency of the seaweed extract hydrogel used in step (c) is a liquid gel. The amount of water may be between 100% to 300% of the original volume of water added in step (a).

In embodiments, in step (b) the concentration of water-soluble cellulose derivative in the water-soluble cellulose derivative solution may be between 2-30% by weight, more suitably 5-20% by weight, even more suitably 13-18% by weight, or most suitably 13.6% by weight. Suitably the consistency of the water-soluble cellulose derivative solution added in step (c) is a runny liquid gel.

In embodiments, step (b) may be conducted at an elevated temperature. Suitably, contact may be at a temperature greater than 80° C., more suitably in the range from 80° C. to 100° C., even more suitably 90 to 100° C.

More particularly, in embodiments where the seaweed extract hydrogel is allowed to cool at the end of step (a), step (c) may comprise, prior to mixing, the step of heating the seaweed extract solution to a temperature greater than 50° C., more particularly 70-100° C., even more particularly 80-90° C. This heating step may be done with stirring, suitably no stirring or other agitation is required during the heating.

In embodiments, step (c) may comprise adding and/or heating the seaweed extract solution and the water-soluble cellulose derivative solution at a temperature greater than 50° C., more suitably 70° C. to 100° C., even more suitably 80° C. to 90° C. Suitably, the heating in step (c) is accompanied by mixing. Suitably, the mixing is performed only at the start of the heating. This mixing may be by stirring. Suitably, the mixing may be for approximately 15 minutes to approximately 30 minutes. Suitably, the heating of the mixture may be longer than the period of mixing. In embodiments, the heating may be for approximately 3 hours to approximately 8 hours. Most suitably, the heating may be for approximately 5 hours. After the stirring is finished the mixture may be heated for 4 to 6 hours without mixing.

Soon after the seaweed extract hydrogel and the water-soluble cellulose derivative solution are mixed, foaming may occur due to bubble formation in the mixture. Foaming may continue throughout the heating in step (c). The foam may be removed at any time during or following step (c), and removal of the foam formed may be repeated. Suitably, the foam is removed approximately 5 hours after mixing in step (c) is complete. Removal of the foam may be pre-empted by, or conducted concurrently with, degassing of the mixture. Such degassing may comprise stirring the mixture during heating to encourage release of bubbles from the mixture. Other forms of degassing, such as ultrasonic treatment and vibration, under atmospheric pressure or under reduced pressure (vacuum) may be used instead or in addition and are also contemplated. Suitably, the mixture will be degassed for approximately 2 hours to approximately 8 hours. Suitably, approximately 2 hours to approximately 6 hours. Most suitably, degassing is performed for approximately 3 to approximately 4 hours. Suitably the degassing occurs with heating in step (c).

The degassing of the mixture in step (c) allows for removal of bubbles which if left in the mixture would reduce the transparency/translucency of the final composition or product formed therefrom.

After degassing and prior to drying the concentration of the mix may be suitable for drying directly or may be adjusted at this stage by addition of water, or other suitable polar solvent. The final concentration of the components at the end of step (c) may be in the range of between 4 to 8 wt %, suitably 6 wt % seaweed extract, in the range of between 0.5 to 3 wt %, suitably 2 wt % water soluble cellulose derivative and in the range of between 80 wt % to 95 wt % water or other suitable polar solvent. All weight percentages being based on the total weight of the mixture at the end of step (c).

Mixtures that have a higher viscosity (before being poured into the mould) result (when dried) in thicker, more structural products, e.g. structural packaging material, which are preferred for most applications of this type. If the prepared mixture has a lower viscosity (before being poured into a mould) the resulting (dried) product, e.g. packaging material film, is generally thinner.

In embodiments, the method may comprise, in step (a), (b) and/or (c), the step of adding one or more additives as defined elsewhere herein. The additives may be dyes or pigments. These can give colour to the composition. Other additives may be a salt or glycerol as described above. Suitably, salt or glycerol may be added to the mixture produced in step (c).

In a further aspect, this invention relates to a method of producing a product as defined above. The method comprises steps (a)-(d) as defined above for forming the composition, and, between steps (c) and (d), the step of forming the mixture into a shape of the product.

The forming step may comprise moulding or vacuum forming, although vacuum forming is generally only suitable for the low seaweed extract compositions. Suitably, moulding may comprise casting, extrusion moulding, compression moulding, press-moulding, injection moulding, rotational moulding or slip forming. Most suitably the moulding is press moulding.

The moulding technique may be selected to be suitable for mass manufacturing, for example injection moulding, press moulding, or casting. A particular feature of the present invention is that the composition after preparation is relatively fluid and requires cooling and/or drying to form a material with the desirable structural rigidity for a given product. While any aforementioned moulding technique may be adapted to accommodate this, press moulding and injection moulding have been found to be particularly beneficial as the fluid composition may be deposited within the female mould prior to insertion of the male part of the mould (or mandrel), thereby ensuring a controlled and well-distributed wall of the desired thickness of the material for the given product.

The material is generally added to the mould at above ambient temperature to retain fluidity of the mixture. Suitably the material is added to the mould at approximately 80° C. to 100° C., or more suitably 85° C. to 95° C. In embodiments, the material is added to the mould at approximately 70° C., 75° C., 80° C., 85° C., 90° C., 95° C. or 100° C. Suitably, the material is added to the mould at approximately 90° C. Below 70° C., the material may solidify complicating or preventing suitable moulding.

Figure 2:
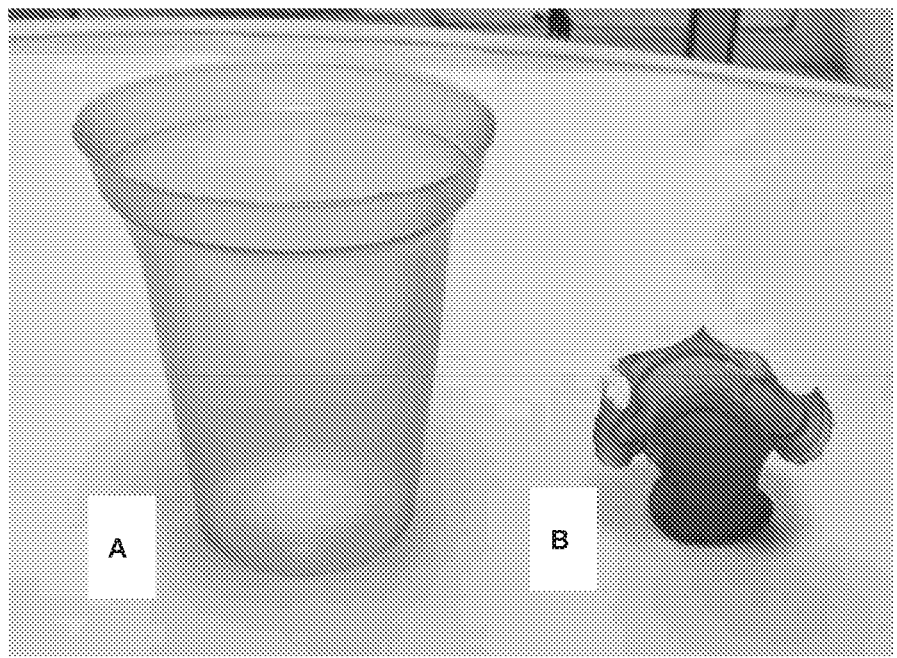
FIG. 2 shows an embodiment of a cup formed of a high seaweed composition (as defined herein) of the present invention. (A) is a cup that has been subjected to drying on the male part of a press mould prior to release, whereas (B) in a cup prepared in the same way that was released from the mould prior to drying. The cup shown in (B) has shrunk/deformed considerably on drying. The tendency for the material to deform when not supported during drying is due to the high-water content (>90 wt % water) at the end of the preparation process.

When the liquid hydrogel cools and solidifies (after an appropriate time), the mould can then be separated, and the material left on at least one of the male or female part of the mould, suitably the male part of the mould (or mandrel) to expose the solidified composition to a drying environment, and thereby promote drying of the composition though evaporation of the solvent, suitably water, from the solidified gel. This process of drying will typically continue until the composition has become suitably rigid and self-supporting (through the process of drying) such that it can be demoulded, resulting in the finished product. In some embodiments, the finished product has an appearance and properties comparable to PET plastic and PLA bioplastic. Furthermore, by retaining the solidified gel on the male mould or mandrel during drying, shrinkage is controlled and deformation is prevented in the finished product (FIG. 2).

In embodiments where the material is at least partially cooled in the mould, the composition is cooled in the mould to ambient temperature. Suitably the composition may be cooled to a temperature below approximately 40° C., and above approximately 0° C. Suitably, the composition may be cooled to a temperature of approximately, or exactly, 30° C., 25° C., 20° C., 15° C., 10° C., 5° C.

In embodiments, the composition of the present invention may be dried at room temperature and pressure. In embodiments, the composition may be dried in a controlled atmospheric environment, for example, a low humidity environment or an environment where humidity is below that of the ambient atmosphere, or under reduced atmospheric pressure, or under ultraviolet (UV) light. Suitably, the means of drying the composition may be in a vacuum oven in which the boiling point of water is reduced. This method is often used for heat sensitive materials such as the composition of the present invention.

The use of heat to further encourage drying may be applied in addition to, or instead of, other methods of drying, including those described above, although care must be taken not to melt the composition. In embodiments, the composition may be dried at a temperature below 60° C.

Suitably, the composition may be dried at a temperature of between 30° C. and 60° C., or between 30° C. and 50° C., most suitably 40° C. Suitably, the composition may be dried at a temperature of at least 30° C., 40° C., or 50° C. Suitably, the composition may be dried at a temperature of at most 60° C., 50° C., 40° C., or 30° C. In reduced atmospheric pressure drying environments, such as a vacuum oven, the desired heating temperatures may be lowered compared to drying in ambient atmospheric conditions.

In other embodiments, or in addition to those embodiments described above, the atmosphere over the mould containing the composition during the drying step may have a low relative humidity. Suitably the relative humidity of the atmosphere over the composition may be approximately 70% or below. Suitably, the relative humidity of the atmosphere over the mould may be between 50% and 70%. Suitably, the relative humidity of the atmosphere over the mould may be approximately 60%, 55%, 50%, 45%, 40% or below.

In other embodiments, or in addition to those embodiments described above, the atmosphere over the mould containing the composition during the drying step may be at a pressure below ambient atmospheric pressure. Suitably, the pressure of the atmosphere over the mould during the drying step may be 7 to 14 psi. Suitably the pressure is at most 14 psi, 13 psi, 12 psi, 11 psi, 10 psi, 9 psi, 8 psi, 7 psi or below. Suitably the pressure is at least 1 psi, 2 psi, 3 psi, 4 psi, 5 psi, 6 psi, 7 psi or above.

Drying can be, for example, at room temperature, in a dehumidifier (max. 60° C.) and/or in a vacuum oven (max. 60° C.).

Figure 3:
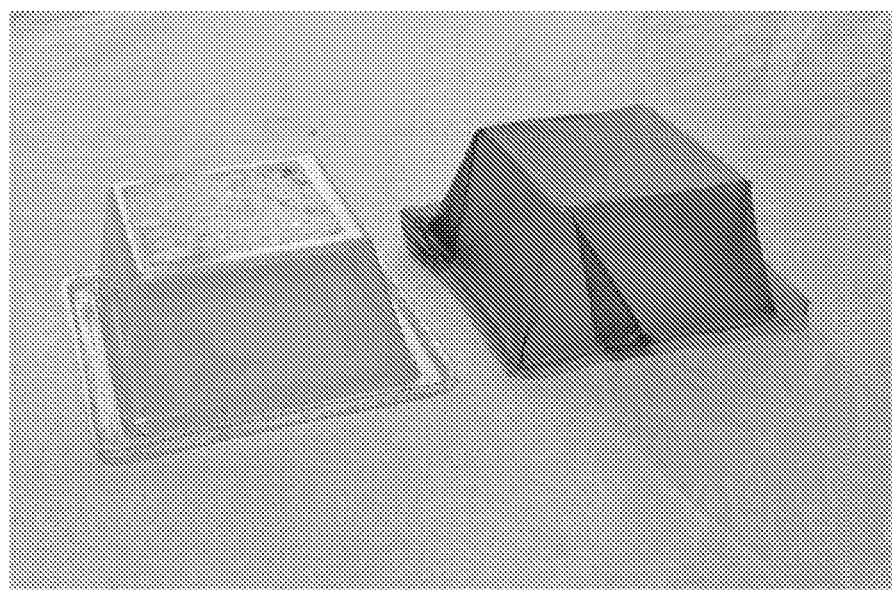
FIG. 3 shows a former or mould (left) and a packaging material (right) comprising a sheet material of a high seaweed composition (as defined herein) of the present invention which is then re-worked in accordance with the invention by being folded over the former and allowed to dry before release. In the example shown, the sheet material was hydrated in order to be formed by dipping the sheet into hot water (90° C.) for 5 seconds then forming it around a former. The sheet on the former was then dried for 5 hours in ambient conditions. Dipping the sheet material into the hot water causes the surface of the sheet material to soften and/or melt. This softened and/or molten material on the sheet's surface is tacky and can act as an adhesive. For example, when surfaces of the sheet material fold on top of each other the molten material on the surface may cause the surfaces that are touching to stick together. Such tackiness may assist in re-working the material.
Figure 4:
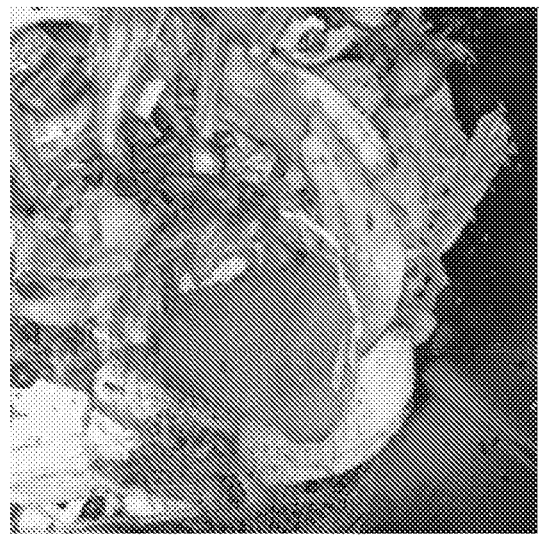
FIG. 4 shows material degradation of a cup formed of a high seaweed composition (as defined herein) of the present invention in home compost after 0 months (A); 1 month (B); and 2 months (C). The cup is surrounded by plastic non-biodegradable netting to retain the degraded material of the cup. Clear biodegradation is evident after 1 month, which is shown continuing to near completion at 2 months.
Figure 4:
Figure 4:
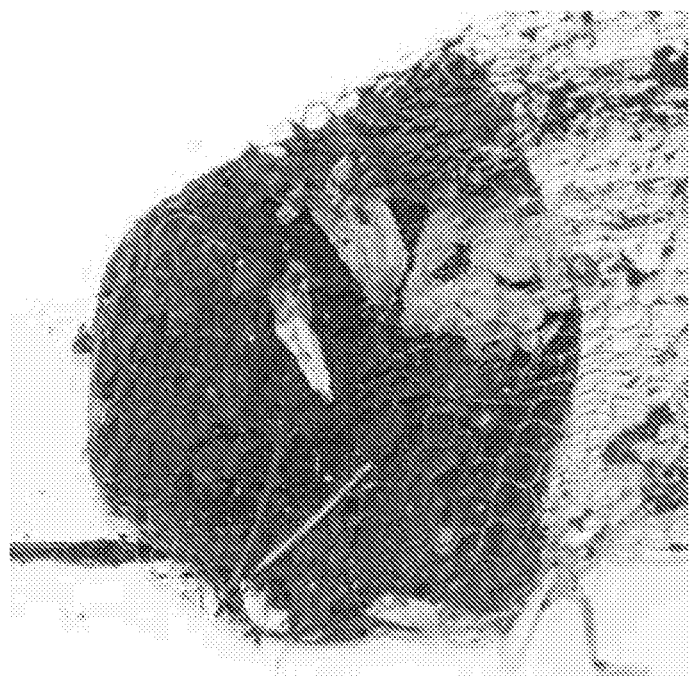
Figure 5:
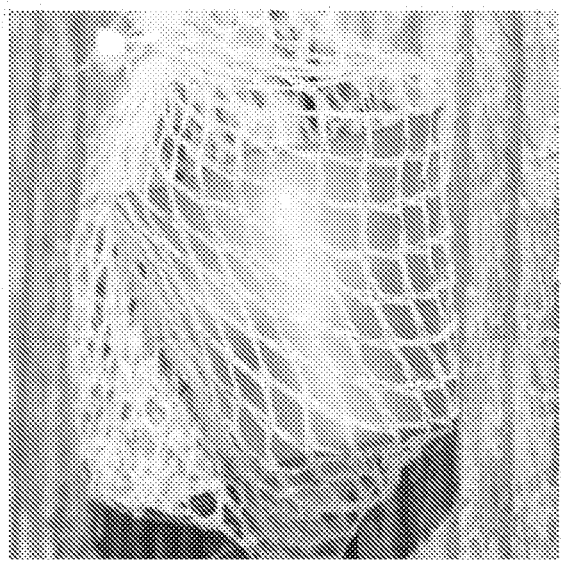
FIG. 5 shows material degradation of a cup formed of the composition of the present invention after having been submersed in sea water at sea for 0 weeks (A); 1 week (B); 2 weeks (C); and 4 weeks (D). The cup is surrounded by plastic non-biodegradable netting to retain the degraded material of the cup. Clear biodegradation is evident after 2 weeks, and only the netting remains after 4 weeks.
Figure 5:
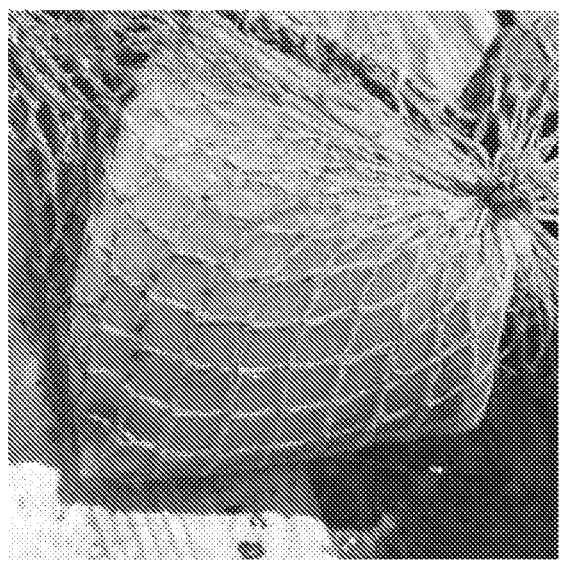
Figure 5:
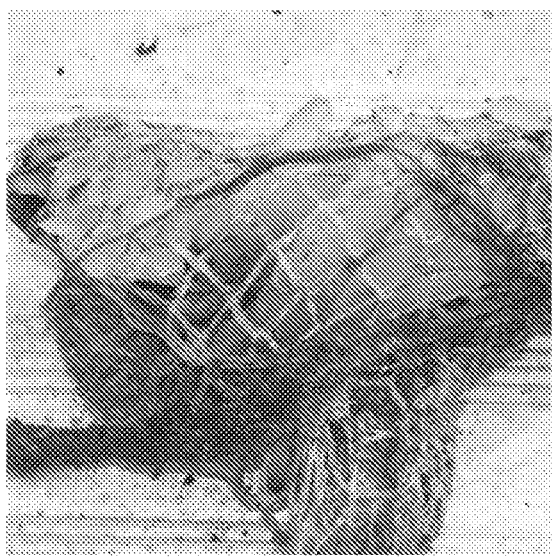
Figure 5:

As best shown in FIG. 3, in embodiments, products may be re-worked from a sheet of the composition of suitable thickness. The re-working may comprise firstly forming a sheet of the composition of the present invention, for example by pouring or depositing the mixture derived from step (c) above onto a flat surface, and then cooling and then drying the composition similar to the manner described above in the context of press moulding. In embodiments the sheet is pinned to the flat surface, suitably by a suitable weight, for example a plate, to prevent shrinkage or deformation during drying. The sheet formed of the composition may then be steamed and/or heated in the presence of water, for example by placing in hot water (above 80° C.) for an appropriate length of time, for example 5 seconds, and then be re-worked into a desired shape. Suitably, re-working may be by a process of wrapping, and then holding, the sheet to the contours of a suitable former. Once the composition has cooled and/or dried sufficiently to form the product, the former may be removed. Re-working may be performed using vacuum forming by applying a vacuum to the sheet such that it is pulled tightly over a suitable former. For re-working, the sheet may have a suitable thickness prior to reworking (i.e. in its shortest dimension) of 0.01 mm to 5 mm, more particularly 0.01 mm to 1 mm, even more particularly 0.05 mm to 0.5 mm.

In a further aspect, the invention also relates to a method of dissolving, degrading, biodegrading or otherwise safely decomposing the composition or product of the earlier aspects of the present invention described above. Alongside the material's ability to fully biodegrade rapidly (less than 4-6 months) in a range of environments, both naturally occurring and man-made such as industrial composting facility, the option of dissolving the composition in water may be important in respect of the management of waste streams. This is particularly relevant for low seaweed composition which has a higher water solubility than the high seaweed composition.

Specifically the ability of the composition to readily dissolve in water may be advantageous in helping to prevent the product-composition from contaminating plastic recycling waste streams if wrongly discarded in a recycling bin by the consumer (the composition is intended for composting waste streams), by facilitation its separation at the point where recyclable plastics are submersed in liquid and washed prior to processing.

In the low seaweed extract embodiments of the composition, or products derived therefrom, the method of dissolving the composition or products comprises the step of contacting the composition or product with liquid water at a temperature of 40° C. or less, more particularly 30° C. or less, even more particularly 25° C. or less. In this embodiment of the method, the composition may comprise the seaweed extract in an amount of 1-10% by weight, more particularly 2-5% by weight. In particular, the composition may comprise the water-soluble cellulose derivative in an amount of 70-95%, by weight, more particularly 80-95%, by weight. More particularly, the composition may comprise 2-20%, by weight water, even more particularly 4-15%, by weight. Suitably, the composition is contacted with the liquid water at a temperature of 30° C. for between 15 to 30 minutes with continuous stirring to effect dissolution.

In the high seaweed extract embodiments of the composition, or products derived therefrom, the method of dissolving the composition or product comprises the step of contacting the composition or product with liquid water at a temperature of at least 50° C., more particularly at least 70° C., even more particularly at least 85° C. In this method, the composition may comprise the seaweed extract in an amount of 40-90% by weight, more particularly 60-90% by weight. In particular, the composition may comprise the water-soluble cellulose derivative in an amount of 5-50% by weight, more particularly 10-40% by weight. More particularly, the composition may comprise 1-20% by weight water, even more particularly 2-15% by weight. Suitably, the composition is contacted with the water at a temperature of 90° C. for between 30 minutes to 1 hour with continuous stirring to effect dissolution.

The ability to dissolve the composition of the present invention, or products derived therefrom, to innocuous, food-safe, water-soluble components has the advantage of providing a simple and reliable waste disposal stream. While the composition and or products will fully and rapidly biodegrade in the environment should this be necessary. The above method provides a means of easy disposal of the composition or products when disposed of through an appropriate managed waste stream. The ability of the composition to dissolve in water dependent on its temperature allows selection of a particular composition for a given use, dependent on the environment, its intended timescale and envisaged waste stream of that use.

EXAMPLES

Example 1—Specific Method for the Preparation of a Composition in Accordance with the Present Invention Carrageenan Kappa in powder form (32.5 g) was added to 510 g of water (20° C.) before being mixed for 5 minutes. The resulting paste was warmed to 80° C. by being placed in a hot water bath (80° C.). As the mixture increased in temperature and reached 80° C. it became a liquid gel (hydrogel). The mixture was held at 80° C. for 1 hour.

In a separate container Methyl Cellulose (MC, 6.5 g) was added to 40 g hot water (80° C.) before mixing for a short period of time (approx. 10 seconds) to form a liquid gel.

The hot MC gel was then added to the hot Carrageenan Kappa gel. Potassium Chloride (1.3 g) was then added to the combined mixture before stirring for 20 minutes. The prepared mixture was left in the hot water bath (80° C.) for 7 hours. After 7 hours the mixture had the appearance of a liquid gel and foam had gathered on the surface of the mixture. The foam was collected and removed from the hydrogel mixture.

A packaging container was produced by pouring the prepared solution at 80° C. into female moulds. Male moulds were then pressed into the female moulds (i.e. press moulding) and the solution allowed to cool to 25° C. whereupon the hydrogel solidified. The mould was then separated and the solidified gel, attached to the male part of the mould, was then left to dry at 60° C. at ambient pressure and humidity until it dried completely (approx. 8 hours). The final composition had a dry and semi-transparent finish.

The resulting packaging comprised 71.3% Carrageenan Kappa, 10% water, 14.3% Methyl Cellulose and 3% Potassium Chloride (contents by weight, based on the total weight of the composition).

The relative weight percentages were calculated based on a water content determined by comparison of the weight of the solidified gel prior to moulding and the final weight of the product. It is assumed that there was no loss of material mass of the MC, CK and potassium chloride through the preparation, or loss of water during preparation prior to drying.

The resulting packaging was fully biodegradable, edible and dissolved in hot water at 80° C. and above.

Example 2—Specific Method for the Preparation of a Composition in Accordance with the Present Invention Carrageenan Kappa in powder form (21.6 g) was added to 340 g of water (10° C.) before being mixed for 15 seconds. The resulting paste was warmed to 90° C. by being placed in a hot water bath (90° C.) for 1 hour. The solution increased in viscosity and became a liquid gel.

In a separate container Methyl Cellulose (MC, 4 g) was added to 22 g hot water (90° C.) and mixed for a short period of time (approx. 5 seconds) to form a liquid gel.

The hot MC gel was then added to the hot Carrageenan Kappa gel. The mixture was stirred for 15 minutes and then left in the hot water bath (90° C.) for 4 hours. After 4 hours the mixture had the appearance of a liquid gel and foam had gathered on the surface of the mixture. The foam was collected and removed from the hydrogel mixture.

A packaging container was produced by pouring the prepared solution at 90° C. into female moulds. Male moulds were then pressed into the female moulds (i.e. press moulding) and the solution allowed to cool to 30° C. whereupon the material solidified. The mould was then separated and the solidified gel solution, still attached to the male mould, was then left to dry at 50° C. for at ambient pressure and humidity for 10 hours. The dried material had a dry and semi-transparent finish.

The resulting packaging comprised 80% Carrageenan Kappa, 5% water and 15% Methyl Cellulose (contents by weight, based on the total weight of the composition).

The relative weight percentages were calculated based on a water content determined by comparison of the weight of the solidified gel prior to moulding and the final weight of the product. It is assumed that there was no loss of material mass of the MC and CK through the preparation, or loss of water during preparation prior to drying.

The resulting packaging was fully biodegradable, edible and dissolved in hot water at 100° C. over 1 hour.

Example 3—Specific Method for the Preparation of a Composition in Accordance with the Present Invention Methyl Cellulose in powder form (MC, 30 g) was added to 100 ml of hot water (80° C.) and mixed for a short period of time (approx. 15 seconds) to form a liquid gel. The resulting solution was placed in a hot water bath (80° C.).

In a separate container Carrageenan Kappa in powder form (2 g) was added to 25 g of cold water (20° C.) before being mixed for 15 seconds. The resulting paste was then heated to 80° C. in a water bath and then added to the MC gel. The resulting mixture was mixed well for 15 minutes and left in the hot water bath at 80° C. for 4 hours, after which it formed a liquid gel (hydrogel). The foams and bubbles that are occurred during the heating process were removed from the surface of the mixture.

A packaging container was produced by pouring the prepared solution at 80° C. into female moulds. Male moulds were then pressed into the female moulds (i.e. press moulding) and the solution allowed to cool to 10° C. such that it solidified. The female moulds were separated and the solidified gel solution attached to the male mould was then left to dry at 50° C. for 10 hours. The dried material had a dry and transparent finish like semi-transparent PLA.

The resulting packaging comprised 84% Methyl Cellulose, 10% water and 5.6% Carrageenan Kappa (contents by weight, based on the total weight of the composition).

The relative weight percentages were calculated based on a water content determined by comparison of the weight of the solidified gel prior to moulding and the final weight of the product.

It is assumed that there was no loss of material mass of the MC and CK through the preparation, or loss of water during preparation prior to drying.

The resulting packaging was fully biodegradable, edible and dissolved in cold water at 30° C. over 1 hour with continuous mixing.

Example 4—Specific Method for the Preparation of a Composition in Accordance with the Present Invention Methyl Cellulose in powder form (MC, 35 g) was added to 100 ml of hot water (90° C.) and mixed for a short period of time (approx. 5 seconds). The resulting gel was placed in a hot water bath (90° C.).

In a separate container Carrageenan Kappa in powder form (1 gram) was added to 25 ml cold water (10° C.) and mixed for a short period of time (approx. 10 seconds). The resulting paste was heated to 90° C. in a water bath and then added to the MC solution. Potassium Chloride (1 g) was then added to the solution. The resulting mixture was mixed well for 10 minutes and left in the hot water bath at 90° C. for 4 hours, after which it formed a liquid gel (hydrogel).

A packaging container was produced by pouring the prepared hydrogel at 90° C. into female moulds. Male moulds were then pressed into the female moulds (i.e. press moulding) and the solution allowed to cool to 10° C. such that it solidified. The mould was separated, and the solidified gel solution attached to the male mould was then left to dry at room temperature for two days. The dried material had a dry and transparent finish like semi-translucent PET.

The resulting composition was fully biodegradable, edible and dissolved in cold water at 30° C. over 30 minutes with continuous mixing.

The resulting packaging comprised 85% Methyl Cellulose, 10% water, 2.5% Carrageenan Kappa and 2.5% Potassium Chloride (contents by weight, based on the total weight of the composition).

The relative weight percentages were calculated based on a water content determined by comparison of the weight of the solidified gel prior to moulding and the final weight of the product after drying. It is assumed that there was no loss of material mass of the MC, CK and potassium chloride through the preparation, or loss of water during preparation prior to drying.

Example 5—General Method for the Preparation of Compositions in Accordance with the Present Invention Carrageenan Kappa in powder form (32.4 grams) was added to 510 g of water (25° C.). The resulting gel was loaded into a double boiler and heated at between 90° C. and 100° C. for 2 hours.

In a separate container Methyl Cellulose (MC, 4 g) was added to 22.2 ml of hot water (95° C.) and stirred for a short period of time (approx. 10 seconds). The resulting gel was then added to the CK hydrogel in the double boiler and mixed for 15 minutes. The heating continued for 6 hours over which time the mixture was gradually degassed by the action of heating. After removal of the formed foam, the mixture was ready for moulding.

The final approximate formulation of the composition was 5.7 wt % Carrageenan Kappa, 0.6 wt % methyl cellulose and 93.7 wt % water (contents by weight, based on the total weight of the composition).

A packaging container was produced by dosing the hot material into a press (female) mould prior to full assembly of the mould. The mixture in the mould was then allowed to cool to ambient temperature over 15-20 minutes. Before the female part of the mould was removed to expose the material on the male part of the mould for drying. As shown in FIG. 2, the material must be left on the mould for the product to prevent excessive shrinkage and retain its shape on drying.

Drying of the product was conducted over two stages. Stage 1 involved drying in the ambient atmosphere at 60° C. for 8 to 12 hours. Stage 2, which followed stage 1, dried the product at 50° C. for up to 6 hours. The product remained on the male part of the mould throughout drying.

The product was then trimmed and released from the male part of the mould before cleaning with ethanol to provide the finished cup.

The resulting packaging comprised 80% Carrageenan Kappa, 10% Methyl Cellulose and 10 water (contents by weight, based on the total weight of the composition).

The relative weight percentages were calculated based on a water content determined by comparison of the weight of the solidified gel prior to moulding and the final weight of the product. It is assumed that there was no loss of material mass of the MC, CK and potassium chloride through the preparation, or loss of water during preparation prior to drying.

Example 6—Preparation of Exemplified Compositions

Compositions 2 to 10 and 12 to 13 in accordance with the present invention were prepared in accordance with the general method of Example 5, replacing and/or adapting the proportions of components as appropriate.

Comparative compositions 1 and 11 which are not in accordance with the invention was also prepared in accordance with the general method of Example 5, replacing and/or adapting the proportions of components as appropriate.

A summary of Compositions 1 to 13 are provided in Table 1:

TABLE 1

| Composition | Seaweed extract (Seaweed extract/water (g) = 32.4/510) | MC/water (g) | Dry material (wt % of total composition) Seaweed extract/MC/water |
|---|---|---|---|
| 1 | Carrageenan Kappa | — | 90/0/10 |
| 2 | Carrageenan Kappa | 4/22.2 | 80/10/10 |
| 3 | Carrageenan Kappa | 6.5/40 | 74.8/15.2 |
| 4 | Carrageenan Kappa | 7/43 | 74.1/15.9/10 |
| 5 | Carrageenan Kappa | 9/55.3 | 70.5/19.5 |
| 6 | Carrageenan Kappa | 10/61.5 | 68.8/21.2/10 |
| 7 | Carrageenan Kappa | 12/74 | 65.7/24.3/10 |
| 8 | Carrageenan Kappa | 13/80 | 64.3/25.7/10 |
| 9 | Carrageenan Kappa | 15/92 | 61.8/28.2/10 |
| 10 | Carrageenan Kappa | 16.2/100 | 60/30/10 |
| 11 | Carrageenan Kappa | 32.4/199.3 | 45/45/10 |
| 12 | Agar | 6.5/40 | 75/15/10 |
| 13 | Carrageenan Iota | 6.5/40 | 75/15/10 |

Example 7—Visual Appearance of Compositions

The visual appearance of the exemplified compositions of Example 6 were tested using the following method.

A light meter (Urceri MT-912) was placed within a light box (Heorryn 40/40/40 cm). The sensor of the light meter was entirely covered by a material sample of each composition at a standard thickness of 0.3 mm, before a light reading was taken and recorded for each sample in lux.

Figure 14:
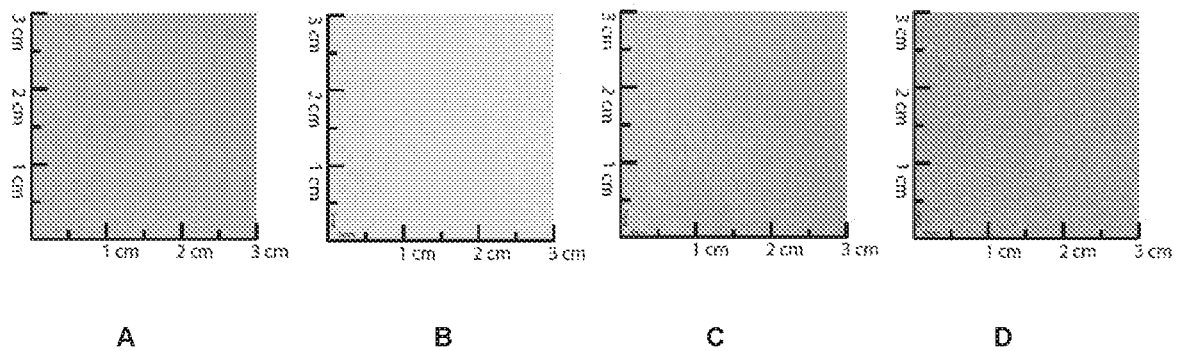
FIG. 14 shows variation in pigmentation of compositions in accordance with the present invention having different, or different proportions of seaweed extracts as defined in Example 6.

The results are shown in Table 2 and FIG. 14:

TABLE 2

Visual appearance of compositions

| Composition | Light transmission (Lux) | Pigmentation | Clarity | Material homogeneity |
|---|---|---|---|---|
| 1 | 794 | Moderate | Moderate | Smooth/Uniform |
| 2 | 794.5 | Low-Moderate | High | Smooth/Uniform |
| 3 | 825 | Low | High | Smooth/Uniform |
| 4 | 800 | Low | High | Smooth/Uniform |
| 5 | 794.7 | Low | High | Smooth/Uniform |
| 6 | 794 | Low | High | Smooth/Uniform |
| 7 | 793.5 | Low | High | Smooth/Uniform |
| 8 | 784.8 | Low | High | Smooth/Uniform |
| 9 | 780.5 | Low | High | Smooth/Uniform |
| 10 | 776.8 | Low | High | Smooth/Uniform |
| 11 | 751.1 | Moderate | Moderate | Rough/Varied |
| 12 | 496.8 | High | Low | Flakey/Varied |
| 13 | 500 | Moderate | Low | Flakey/Varied |

Each of the compositions 1 to 13 allowed some degree of light transmission, i.e. were translucent. Compositions 1 to 11 comprising the seaweed extracts carrageenan kappa had high levels of light transmission.

Compositions 2 to 10 comprising carrageenan kappa and methyl cellulose had low pigmentation levels. Composition 1 comprising carrageenan kappa alone, and Compositions 11 (with increased amount of MC) 12 to 13 comprising same amounts of methyl cellulose and the seaweed extracts agar or carrageenan iota had moderate or high pigmentation levels.

Compositions 1 to 10 had smooth and uniform homogeneity whereas Composition 11 comprising equal amount of methyl cellulose and carrageenan kappa and Composition 12 and 13 comprising the seaweed extracts agar or carrageenan iota with low amount of MC had rough or flaky and varied homogeneity.

From the above, it is apparent that the visual appearance of the compositions was best for compositions comprising carrageenan kappa and methyl cellulose in relative proportions in accordance with the present invention.

FIG. 14 clearly shows that the pigmentation of Composition 4 (B) is significantly less than, in order, Composition 11 (C), Composition 1 (A) and Composition 12 (D).

Example 8—Visual Appearance variation with Thickness

The variation in visual appearance with thickness of the composition was measured for Composition 4 (Example 6) in accordance with the following method:

A light meter (Urceri MT-912) was placed within a light box (Heorryn 40/40/40 cm). The sensor of the light meter was entirely covered by a material sample of each thickness, before a light reading was taken and recorded for each sample in lux.

The results are provided in Table 3:

TABLE 3

Visual appearance of composition 4 at varying thicknesses

| Thickness (mm) | Light transmission (Lux) | Pigmentation | Clarity |
| --- | --- | --- | --- |
| 0.1 | 940.7 | Very Low | Very High |
| 0.2 | 880.4 | Low | High |
| 0.3 | 800 | Low | High |
| 0.5 | 754.3 | Moderate | Moderate |

As expected, the light transmission decreases uniformly with increasing thickness. In addition, pigmentation and clarity reduce with increasing thickness. Nevertheless, even at the highest thickness of 0.5 mm, the material of Composition 4 provides exceptional visual appearance similar to that of petroleum based transparent plastics such as PET, or bioplastics such as PLA.

Example 9—Water Absorption

The water absorption properties of the exemplified compositions of Example 6 were tested using the following method.

Material samples of each composition were prepared at uniform dimensions 5 mm/90 mm/0.3 mm to form strips weighing approximately 0.3 g each. Each strip was weighed (Pocket Scale, Model: PS-200B) before being fully submersed in a beaker of 250 ml of tap water at room temperature for 24 hours. Each strip was then removed from its beaker and residual surface water on each strip was removed. The weight of each strip was then recorded and the percentage change in weight was calculated.

The results are shown in Table 4:

TABLE 4

Water absorption by compositions

| Composition | Change in weight |
| --- | --- |
| 1 | 1380% |
| 2 | 1300% |
| 3 | 1280% |
| 4 | 1250% |
| 5 | 1200% |
| 6 | 1190% |
| 7 | 1150% |
| 8 | 1090% |
| 9 | 1015% |
| 10 | 1000% |
| 11 | 925% |
| 12 | 350% |
| 13 | 410% |

Each of Compositions 1 to 11 shows high levels of absorption of water. The results show a general trend for better water absorption with increasing seaweed content, when the seaweed extract is carrageenan kappa. Compositions 12 and 13 comprising the seaweed extracts agar and carrageenan iota respectively showed a lesser degree of water absorption than those compositions comprising carrageenan kappa.

As water absorption is linked to improved biodegradability and increased shelf-life, it would be expected that biodegradability and increased shelf-life performance would decrease from Composition 1 to Composition 13.

Example 10—Mouldability

The ability to mould the exemplified compositions of Example 6 was tested using the following method.

Compositions were formed in a press-mould comprising male and female components. Upon removing one part of the mould, the adhesive properties of each composition in gel-state could be observed before drying. It was recorded how different compositions adhered to the mould in lesser or greater degrees.

Figure 15:
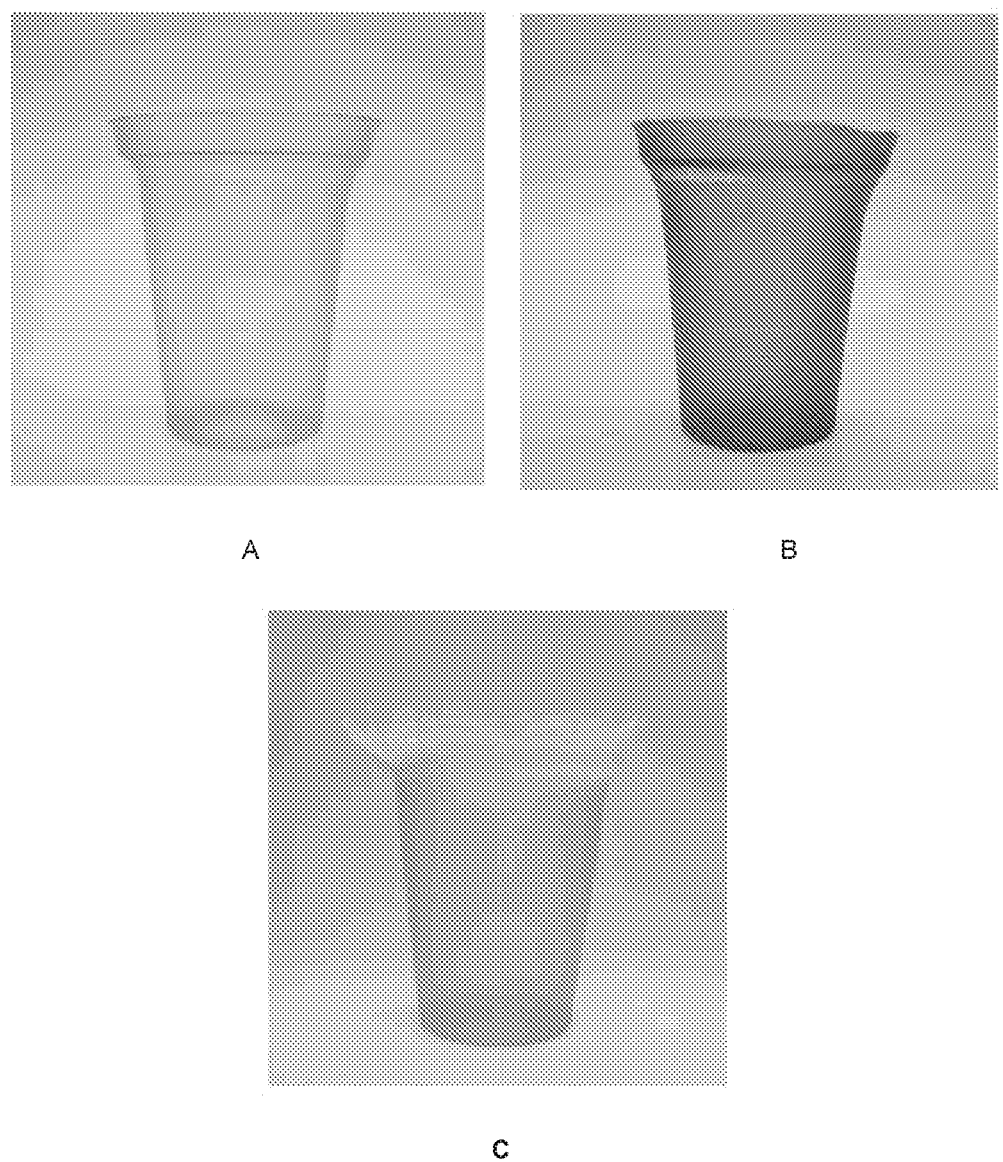
FIG. 15 shows a cup formed from: (A) a composition comprising carrageenan kappa and methyl cellulose in accordance with the present invention; (B) a composition comprising carrageenan iota and methyl cellulose in accordance with the present invention; and (C) a composition comprising agar and methyl cellulose in accordance with the present invention. The proportions of the given seaweed extract, methyl cellulose and water is constant in each cup. It can be clearly seen that all compositions can be moulded to form rigid and load bearing structures. The cup formed from carrageenan kappa (A) has no moulding defects whereas the cups formed from agar (B), shows a split that occurred on drying, and carrageenan iota (C) which showed instability on solidifying leading to a ruffled top edge. It is also evident that the cup formed with agar (B) has high pigmentation.

The results are shown in Table 5 and FIG. 15:

TABLE 5

Mouldability of compositions

| Composition | Mouldable | Adhesion to mould |
| --- | --- | --- |
| 1 | +++ | Low |
| 2 | +++ | Low |
| 3 | +++ | Low |
| 4 | +++ | Low |
| 5 | +++ | Low |
| 6 | ++ | Low/Moderate |
| 7 | ++ | Moderate |
| 8 | ++ | Moderate |
| 9 | ++ | Moderate |
| 10 | + | High |
| 11 | + | Very high |
| 12 | + | Very high |
| 13 | + | Very high |

+++ = highly mouldable, easy flow into mould; stable on solidifying
++ = mouldable, experienced minor difficulties in depositing in mould, or on solidifying
+ = mouldable, experienced more significant difficulties in depositing in mould, or on solidifying Compositions that adhere to the mould make it difficult to fill the mould uniformly. Furthermore, moulded products tend to be damaged as one part of the mould is removed and adheres to the material.

Compositions 1 to 11 comprising carrageenan kappa all demonstrated acceptable mouldability, although adhesion to the mould was noted with higher MC compositions, Composition 11 in particular.

Compositions 12 and 13 comprising agar and carrageenan iota respectively had lower viscosity than the carrageenan kappa compositions with the same amount of methyl cellulose mixture, and as a result they needed longer time to form a solid gel prior to the mould being removed for drying. Composition 13 (carrageenan iota) failed to form a solid gel and the surface was very tacky so that it had high adherence to the mould. Composition 12 (agar) formed a solid gel but the surface split during drying.

FIG. 15 shows a cup formed from (A) Composition 4 (carrageenan kappa); (B) Composition 12 (carrageenan iota); and (C) Composition 13 (agar). It can be clearly seen that all compositions can be moulded to form rigid and load bearing structures. The cup formed from carrageenan kappa (A) clearly has fewer moulding defects than the cups formed from agar (B), which shows a split on drying, or carrageenan iota (C) which shows instability on solidifying leading to a ruffled top edge.

Example 11—Breaking Strength of Compositions

The breaking strength of the exemplified compositions of Example 6 was tested using the following method.

Material samples of each composition were prepared at uniform dimensions 5 mm/90 mm/0.3 mm to form strips. At their short sides, strips where clamped, covering each end: one clamp anchored and static; the other attached to a variable weight, thus placing the strip under tension. Using this set-up, by incrementally increasing the tensile stress on each strip in turn, it was recorded what load each strip withstood before failure.

The results are shown in Table 6:

TABLE 6

Breaking strength of compositions
(tensile stress)

| Composition | Max. load before breaking (kg) |
| --- | --- |
| 1 | 6 |
| 2 | 6 |
| 3 | 5.8 |
| 4 | 5.7 |
| 5 | 5.7 |
| 6 | 5.5 |
| 7 | 5.4 |
| 8 | 5.4 |
| 9 | 5.5 |
| 10 | 5.2 |
| 11 | 4.9 |
| 12 | 3.7 |
| 13 | 4 |

The results show that all compositions (1 to 13) demonstrated good breaking strength. Compositions 1 to 11 comprising carrageenan kappa appeared to show better breaking strength than those compositions comprising agar (Composition 12) or carrageenan iota (Composition 13).

Breaking strength is a surrogate measure for the tensile strength of a material and as such provides a measure of the ability for a composition to be formed into thin-walled products which are rigid and have good load bearing properties.

Example 12—Re-Working of the Compositions

Sheets of the composition of the present invention may be formed by pouring the prepared liquid composition of Example 6 into a suitable shallow flat tray and drying in a similar manner to the product of Example 6. For sheet products, the cooling compositions needs to be pinned to the surface on which it rests, for example by a weighted plate above it, to prevent deformation and/or shrinkage.

As best shown in FIG. 3, the composition when in sheet form may be re-worked after drying to form products. In particular, the dried composition becomes malleable when exposed to heat, moisture and/or pressure and can be moulded and/or adhere to itself or a suitable former or jig. Once the heat, moisture and/or pressure is removed the formed, the product may be removed from the former or jig.

Example 13—Example of Biodegradation of the Composition

Figure 6:
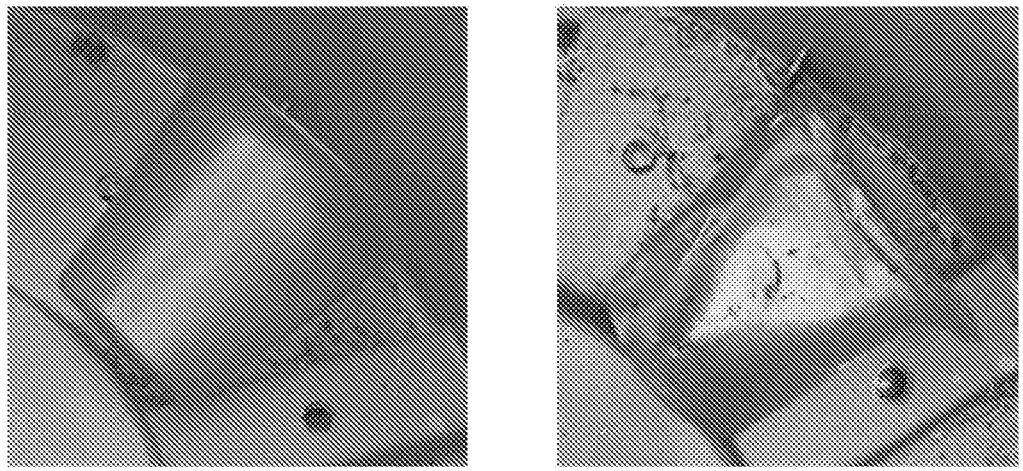
FIG. 6 shows material degradation of a cup formed of the composition of the present invention in open air (simulating a road-side or urban environment) after 0 weeks (A); 1 week (B); and 4 weeks (C). Clear biodegradation is evident after 1 week, and continues up to 4 weeks, where significant biodegradation is visible.
Figure 6:
Figure 7:
FIG. 7 shows the cup of FIG. 6 after 4 weeks in comparison to a prior art PLA lined paper cup (white) and a PET plastic cup (transparent), both of which show no signs of degradation.
Figure 8:
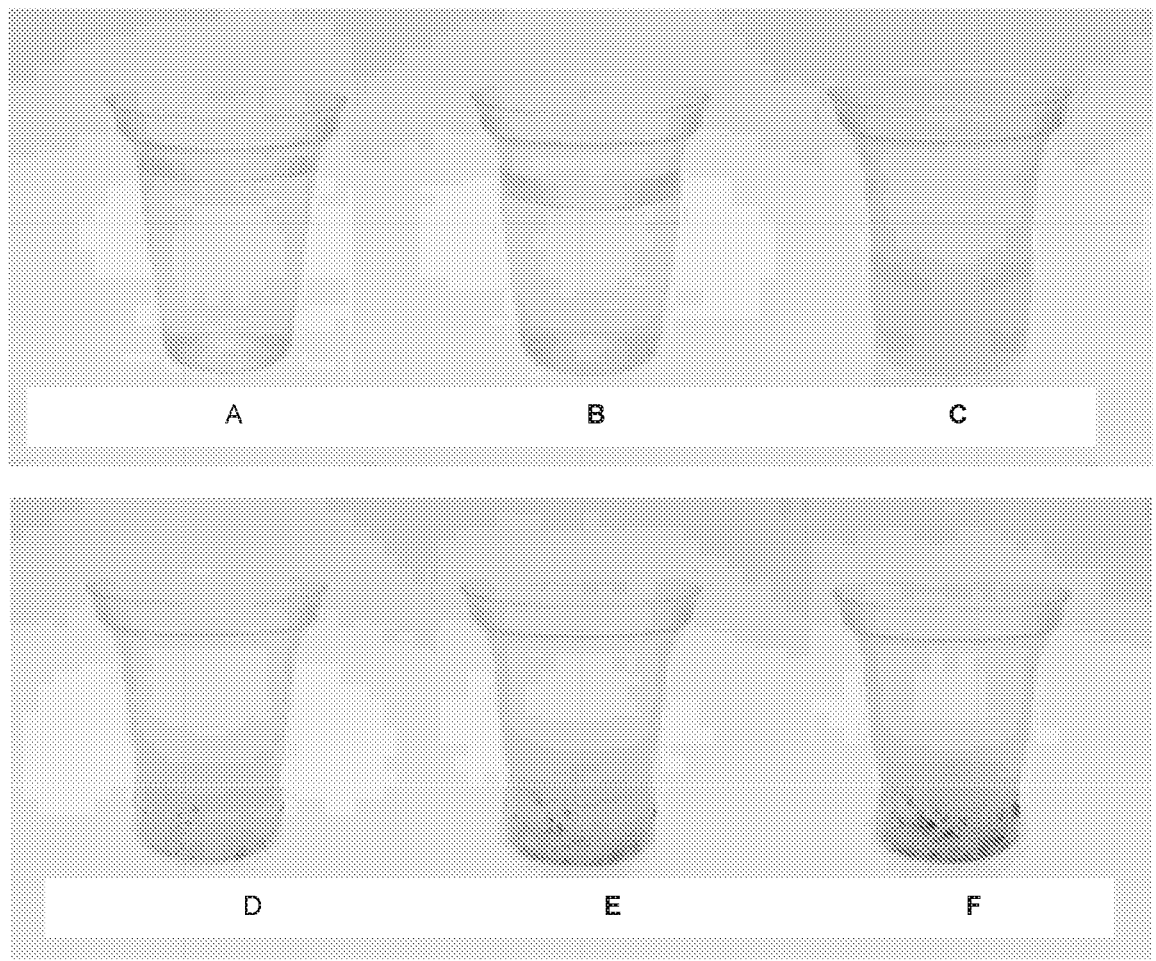
FIG. 8 shows the biodegradation of a cup containing water formed of the composition of the present invention in the air at room temperature after 10 seconds (A); 3 hours (B); 3 days (D); 9 days (E); 14 days (F) and 21 days (G). During this time frame, deformation of the cup is evident but structural rigidity is retained and the cup remains standing and watertight. From 9 days onward bacterial growth is evident, as the biodegradation process continues through 14 and 21 days.
Figure 13:
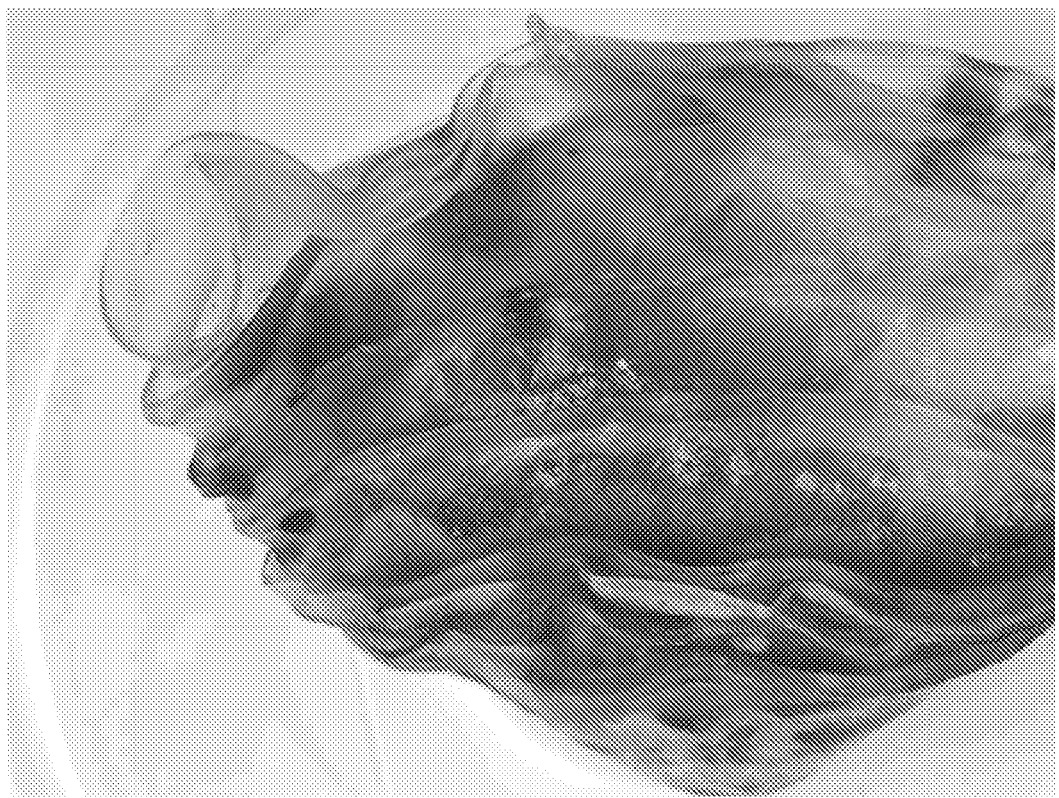
FIG. 13 shows material degradation of a cup formed of the composition of the present invention in anaerobic conditions.

As shown in FIGS. 4 to 6 and 13, the composition of the present invention rapidly biodegrades in a range of environmental conditions. The biodegradation process is well progressed in home compost after two months (FIG. 4), submersed in sea water in 4 weeks (FIG. 5) in the open air in 4 weeks (FIG. 6). As shown in FIG. 13, degradation in anaerobic conditions is much less due to the reduced ability for some microorganisms to act on the material, however, clear biological activity is visible and appears to be breaking down the composition.

Example 14—Elongation of Shelf-Life

As shown in FIGS. 10 to 12, perishable food products stored in packaging or structural stock keeping units (SKUs) made of the composition of the present invention show a significant elongation in shelf-life.

FIG. 10 shows a comparative example of the storage of soft fruit (strawberries) in unrefrigerated ambient conditions, in packaging material formed of the composition of the present invention (bottom line) compared to packaging material formed of petroleum-derived PET (top line), after 1-2 days (column A), 3 days (column B) and 4 days (column C). It is evident that there is condensation on the inner wall of the PET packaging after 3 days which increases by 4 days. No condensation is evident on the packaging formed of the present invention. As condensation implies high humidity which encourages bacterial and fungal growth, it suggests packaging of the present invention would lead to lower rates of bacterial or fungal growth on the food product contained therein due to high water absorption rate of the composition of the present invention.

FIG. 11 shows a comparative example of the storage of soft fruit (raspberries) in unrefrigerated ambient conditions in packaging material formed of the present invention (right column) compared to packaging material formed of petroleum-derived PET (left column) after 1 day (row A), 2 days (row B); 3 days (row C); 4 days (row D); 5 days (row E); and 6 days (row F). It is evident that the raspberries in the PET cup start to develop mould on the third day, whereas raspberries in the cup formed of the composition of the present invention are free of mould until day 6, yielding a 100% increase in shelf-life.

FIG. 12 shows a slice of cheddar cheese that has been heat sealed in a pouch made from the composition of the present invention. The top figure shows the cheese immediately after sealing, and the bottom picture shows the same cheese after storage for 1.5 years in non-refrigerated, ambient conditions and room temperature (approximately 20-25° C.). There is no visible sign of deterioration of the cheese after this time period.

Although particular embodiments of the invention have been disclosed herein in detail, this has been done by way of example and for the purposes of illustration only. The aforementioned embodiments are not intended to be limiting with respect to the scope of the invention. It is contemplated by the inventor that various substitutions, alterations, and modifications may be made to the invention without departing from the scope of the invention.

The invention claimed is:

1. A composition consisting of a seaweed extract in an amount of 60-90% by weight, a water-soluble cellulose derivative in an amount of 10-40% by weight and water in an amount of 1-20% by weight, of the total weight of the composition.

2. The composition of claim 1, wherein the seaweed extract is present in an amount of 66-90% by weight, the water-soluble cellulose derivative in an amount of 10-35% by weight and water in an amount of 2-15% by weight.

3. The composition of claim 1, wherein the seaweed extract is selected from the group consisting of: carrageenan iota; carrageenan kappa; agar; and a mixture thereof.

4. The composition of claim 1, wherein the water-soluble cellulose derivative is selected from the group consisting of: methyl cellulose (MC); hydroxypropyl methylcellulose (HPMC); and a mixture thereof.

5. The composition of claim 1, wherein the composition has a property selected from the group consisting of:
    (a) fully biodegradable;
    (b) fully compostable;
    (c) edible; and
    (d) mouldable; optionally wherein the composition is mouldable by press moulding, extrusion moulding, injection moulding or casting.

6. The composition of claim 1, wherein the composition is re-worked after moulding.

7. A composition comprising a seaweed extract in an amount of 60-90% by weight, a water-soluble cellulose derivative in an amount of 10-40% by weight and water in an amount of 1-20% by weight, of the total weight of the composition; wherein the composition further comprises one or more additives, and wherein the one or more additives are present in no greater than 5% by weight of the total weight of the composition.

8. The composition of claim 7, wherein the one or more additives are selected from the group consisting of: inorganic salt; sawdust, paper, hemp fibre; calcium carbonate; glycerine; apple puree; starch; montmorillonite (MMT); cinnamon bark oil; soybean oil; glycerol; glucose; silver nanoparticles; grapefruit seed extract; zataria multifloro essential oil; nonoclay or clay mineral; polyethylene glycol (PEG); chitin; arabinoxylan; banana powder; gelatine; titanium oxide nanoparticles; colourings; and flavourings.

9. A method of producing the composition of claim 1, the method comprising the steps of:
    (a) contacting the seaweed extract with water to form a seaweed extract hydrogel,
    (b) separately contacting the water-soluble cellulose derivative with water to form a water-soluble cellulose derivative solution,
    (c) mixing the seaweed extract hydrogel and the water-soluble cellulose derivative solution to form a mixture, and
    (d) allowing the mixture to dry in order to form the composition.

10. The method of claim 9, wherein the method comprises steps selected from the group consisting of:
    step (a) comprises (i) contacting the seaweed extract with water at a temperature in the range of approximately 5° C. and approximately 40° C.; and then (ii) heating the mixture of the seaweed extract in water to a temperature in the range of approximately 70° C. to approximately 100° C. to form the seaweed extract hydrogel;
    in step (b) the water-soluble cellulose derivative is contacted with water at a temperature of approximately 70° C. to approximately 100° C.;
    step (c) comprises mixing the seaweed extract solution and the cellulose derivative solution at a temperature of approximately 70° C. to approximately 100° C.

11. The method of claim 9, wherein between steps (c) and (d) there is an additional step of: forming the mixture into a shape or a three-dimensional form of a product.

12. The method of claim 11, wherein the step of forming comprises moulding, wherein the moulding is selected from the group consisting of: press moulding, injection moulding, extrusion moulding or casting.

13. The method of claim 11, wherein during step (d), the solid composition is supported on at least part of a mould that was used in the moulding.

14. The method of claim 11, wherein the method further comprises:
    (e) softening or melting the product by contacting the product with water or steam to provide a softened product;
    (f) further manipulating the softened product to provide a re-worked product, wherein the re-worked product has a different shape to the product;
    (g) allowing the re-worked product to dry to provide a dried re-worked product.

15. The method of claim 14, wherein—the method has features selected from the group consisting of:
    the water in step (e) is at a temperature of greater than 80° C., or is steam;
    the manipulation in step (f) comprises re-working the softened product to the shape of a former or mould.

16. A method of extending shelf-life of perishable goods, wherein the method comprises placing the perishable goods into a structural stock-keeping unit formed of the composition of claim 1.

17. The method of claim 16, wherein the perishable goods are selected from the group consisting of: fruit; vegetables; dairy products; cheese; bread; cake; biscuits; meat products and confectionary.

18. The method of claim 16, wherein the shelf-life of the perishable goods is extended by at least 25%.

* * * * *